(12) United States Patent
Lynch

(10) Patent No.: US 9,558,576 B2
(45) Date of Patent: Jan. 31, 2017

(54) PATH SIDE IMAGE IN MAP OVERLAY

(71) Applicant: HERE Global B.V., Veldhoven (NL)

(72) Inventor: James Lynch, Chicago, IL (US)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 14/677,345

(22) Filed: Apr. 2, 2015

(65) Prior Publication Data

US 2015/0213637 A1 Jul. 30, 2015

Related U.S. Application Data

(63) Continuation of application No. 13/341,152, filed on Dec. 30, 2011, now Pat. No. 9,024,970.

(51) Int. Cl.
| | | |
|---|---|---|
| *G06T 17/05* | (2011.01) | |
| *G06T 11/60* | (2006.01) | |
| *G06T 19/00* | (2011.01) | |
| *G01C 21/36* | (2006.01) | |
| *G06T 3/60* | (2006.01) | |
| *G06T 7/00* | (2006.01) | |
| *G06T 11/00* | (2006.01) | |

(52) U.S. Cl.
CPC .......... *G06T 11/60* (2013.01); *G01C 21/3635* (2013.01); *G01C 21/3647* (2013.01); *G06T 3/60* (2013.01); *G06T 7/0057* (2013.01); *G06T 11/001* (2013.01); *G06T 17/05* (2013.01); *G06T 19/00* (2013.01); *G06T 2207/10028* (2013.01)

(58) Field of Classification Search
CPC ........ G06T 11/206; G06T 15/00; G06T 15/20; G06T 17/05
See application file for complete search history.

(56) References Cited

U.S. PATENT DOCUMENTS

| | | |
|---|---|---|
| 5,070,401 A | 12/1991 | Salvati et al. |
| 5,790,086 A | 8/1998 | Zelitt |

(Continued)

FOREIGN PATENT DOCUMENTS

| | | |
|---|---|---|
| EP | 1584897 A2 | 10/2005 |
| EP | 2309463 | 4/2011 |

(Continued)

OTHER PUBLICATIONS

Anderson et al., Unwrapping and Visualizing Cuneiform Tablets, 2002, p. 82-88, vol. 22, Issue 6, IEEE Computer Graphics and Applications.

(Continued)

*Primary Examiner* — Ryan D McCulley
(74) *Attorney, Agent, or Firm* — Lempia Summerfield Katz LLC

(57) ABSTRACT

One or more systems, devices, and/or methods for generating a map including path side data include storing path side data referenced to three-dimensional geographic coordinates. The path side data may be optical data or optical data modified based on one or more panoramic images. The path side data is combined with map data received from a map database. The map data includes nodes and segments. A processor rotates the path side data based on one of the segments. The rotation may be about the segment or about a featured identified in the optical data. The path side data overlaid on the map data is outputted to a display, a file, or another device.

20 Claims, 21 Drawing Sheets

(56) References Cited

U.S. PATENT DOCUMENTS

| | | |
|---|---|---|
| 6,417,850 B1 | 7/2002 | Kang |
| 6,507,665 B1 | 1/2003 | Cahill et al. |
| 6,552,744 B2 | 4/2003 | Chen |
| 6,999,620 B1 | 2/2006 | Harville |
| 7,003,136 B1 | 2/2006 | Harville |
| 7,626,596 B2 | 12/2009 | Kotake et al. |
| 8,334,867 B1 | 12/2012 | Davidson |
| 2002/0176619 A1 | 11/2002 | Love |
| 2004/0169724 A1 | 9/2004 | Ekpar |
| 2005/0280661 A1 | 12/2005 | Kobayashi et al. |
| 2006/0002590 A1 | 1/2006 | Borak |
| 2006/0072848 A1 | 4/2006 | Razzano |
| 2006/0184320 A1 | 8/2006 | Hong |
| 2007/0046448 A1* | 3/2007 | Smitherman .............. 340/431 |
| 2007/0076920 A1 | 4/2007 | Ofek |
| 2007/0233380 A1 | 10/2007 | Tanaka |
| 2007/0237424 A1 | 10/2007 | Burg et al. |
| 2009/0027418 A1 | 1/2009 | Maru et al. |
| 2009/0079738 A1 | 3/2009 | Liao |
| 2009/0195536 A1 | 8/2009 | Louise et al. |
| 2009/0310867 A1 | 12/2009 | Matei et al. |
| 2010/0204964 A1 | 8/2010 | Pack et al. |
| 2010/0235154 A1 | 9/2010 | Meurer et al. |
| 2010/0245535 A1 | 9/2010 | Mauchly |
| 2010/0305854 A1 | 12/2010 | Kammel et al. |
| 2011/0098918 A1 | 4/2011 | Siliski et al. |
| 2011/0109617 A1 | 5/2011 | Snook et al. |
| 2011/0109618 A1 | 5/2011 | Nowak et al. |
| 2011/0141141 A1 | 6/2011 | Kankainen |
| 2011/0164037 A1* | 7/2011 | Yoshida .............. G06T 15/08 345/419 |
| 2011/0206274 A1 | 8/2011 | Tateno et al. |
| 2011/0216935 A1 | 9/2011 | Mays et al. |
| 2011/0246055 A1 | 10/2011 | Huck et al. |
| 2011/0267440 A1 | 11/2011 | Kim et al. |
| 2011/0279452 A1 | 11/2011 | Ibe et al. |
| 2011/0283223 A1 | 11/2011 | Vaittinen et al. |
| 2011/0289510 A1 | 11/2011 | Lin et al. |
| 2011/0293180 A1 | 12/2011 | Criminisi et al. |
| 2011/0310091 A2 | 12/2011 | Yoshida et al. |
| 2011/0313653 A1 | 12/2011 | Lindner |
| 2012/0044476 A1 | 2/2012 | Earhart et al. |
| 2012/0051631 A1 | 3/2012 | Nguyen et al. |
| 2012/0059720 A1 | 3/2012 | Musabji et al. |
| 2012/0076361 A1 | 3/2012 | Fujiyoshi |
| 2012/0114225 A1 | 5/2012 | Lim et al. |
| 2012/0133639 A1 | 5/2012 | Kopf et al. |
| 2012/0223937 A1 | 9/2012 | Bendall |
| 2013/0030699 A1 | 1/2013 | Barnes et al. |
| 2013/0038689 A1 | 2/2013 | McDowall |
| 2013/0155180 A1 | 6/2013 | Wantland et al. |
| 2013/0202197 A1 | 8/2013 | Reeler et al. |
| 2013/0308013 A1 | 11/2013 | Li et al. |
| 2014/0375638 A1 | 12/2014 | Tomaru et al. |
| 2015/0062305 A1 | 3/2015 | Murayama et al. |

FOREIGN PATENT DOCUMENTS

| | | |
|---|---|---|
| WO | WO2009131276 A1 | 10/2009 |
| WO | WO2010012310 | 2/2010 |
| WO | WO2010024212 | 3/2010 |

OTHER PUBLICATIONS

David Gallup et al., "Piecewise Planar and Non-planar Stereo for Urban Scene Reconstruction", Jun. 13, 2010, pp. 1418-1425, 2010 IEEE Conference on Computer Vision and Pattern Recognition.
Ding, Min, et al., "Automatic Registration of Aerial Imagery with Untextured 3D LiDAR Models," University of California Berkeley, pp. 1-8.
Frueh et al., Data Processing Algorithms for Generating Textured 3D Building Facade Meshes from Laser Scans and Camera Images, 2005, p. 159-184, vol. 61, International Journal of Computer Vision.
Hu et al., Integrating LiDAR, Aerial Image and Ground Images for Complete Urban Building Modeling, 2006, p. 184-191, 3D Data Processing, Visualization and Transmission.
Inpainting, viewed Nov. 30, 2011, http://iat.ubalt.edu/summers/math/inpainting.htm.
International Search Report and Written Opinion cited in PCT/EP2012/069812, mailed Mar. 6, 2013.
International Search Report and Written Opinion from PCT/EP2012/074881, mailed Apr. 8, 2013.
International Search Report and Written Opinion, from related International Application No. PCT/EP2012/070438, Apr. 17, 2013.
International Search Report and Written Opinion, from related International Application No. PCT/EP2012/075022, Apr. 15, 2013.
Kawakiita Three-Dimensional Video Image Composition by Depth Information, Aug. 10, 2004, vol. 1, IEICE Electronics Press.
Kopf et al., Street Slide: Browsing Street Level Imagery, 8 pages, Microsoft Research.
Song et al., Assessing the Possibility of Land-Cover Classification using LiDAR Intensity Data, 2002, p. 259-262, International Archives, of Photogrammetry.
Stephen Shankland, "Google Gathers 3D Data with Street View", May 15, 2008, retrieved from the internet: URL: http://news.cnet.com.
U.S. Appl. No. 13/278,499, filed Oct. 21, 2011.
U.S. Appl. No. 13/278,512, filed Oct. 21, 2011.
U.S. Appl. No. 13/278,546, filed Oct. 21, 2011.
U.S. Appl. No. 13/332,718, filed Dec. 21, 2011.
U.S. Appl. No. 13/340,923, filed Dec. 30, 2011.
Wei, Building Boundary Extraction Based on LiDAR Point Clouds Data, 2008, pp. 157-162, 37, Part B3b, International Archives of Phtotgrammetry Remote Sensing and Spatial Information Sciences.
Yu et al., Automated Derivation of Urban Building Density Information using Airborne LiDAR Data and Object-Based Method, 2010, p. 210-219, Elsevier, Landscape and Urban Planning 98.
Communication Pursuant to Article 94(3) EPC in EP12798315.3, mailed Nov. 20, 2015.
Communication Pursuant to Article 94(3) EPC in EP12805510.0, mailed Nov. 11, 2015.

\* cited by examiner

P = 3D Optically measured point (eg. point of a building)
C = Road center point
w = Road width (or arbitrary fold location)
F = Fold point (eg. F = C + wN where N = Unit normal to road direction)

Point P is folded about point F $P_{rotated} = M_R \cdot (P - F) + F$
where
$M_R$ = Rotation matrix

PATH SIDE IMAGE IN MAP OVERLAY

This application is a continuation under 37 C.F.R. §1.53(b) and 35 U.S.C. §120 of U.S. patent application Ser. No. 13/341,152 filed Dec. 30, 2011, which in incorporated by reference in its entirety.

REFERENCE TO RELATED APPLICATIONS

The present patent application is related to the copending patent application filed on the same date, Ser. No. 13/340,923, entitled "PATH SIDE IMAGERY," the entire disclosure of which is incorporated by reference herein.

BACKGROUND OF THE INVENTION

The present invention relates to maps and navigation and, more particularly, to method(s) and system(s) for overlay path side imagery on a map.

Conventional map applications include graphical representations of roads as well as icons corresponding to points of interest. The map applications may calculate and display a route from an origin point to a destination point. The route may be selectable between driving, walking, public transportation, and biking.

Some map applications illustrate a view from the perspective of a roadway through the manipulation of image bubbles. Image bubbles are panoramic images collected with respect to a single perspective. The image bubbles may extend nearly 360 degrees along one or more axes. Zooming and panning within an image bubble provides a view from a particular viewpoint. To view another perspective, a typical street level viewing application must be switched to the next image bubble. That is, in order to view the scene along the side of the street, a user must select a direction to move to the next image bubble and wait for the next image bubble to load, which may also require a panning operation.

SUMMARY OF THE INVENTION

One or more systems, devices, and/or methods for generating a map including path side data are described. The path side data is stored referenced to three-dimensional geographic coordinates. The path side data may be optical data or optical data modified based on one or more panoramic images. The path side data is combined with map data received from a map database. The map data includes nodes and segments. A processor rotates the path side data based on one of the segments. The rotation may be about the segment or about a featured identified in the optical data. The path side data overlaid on the map data is outputted to a display, a file, or another device.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
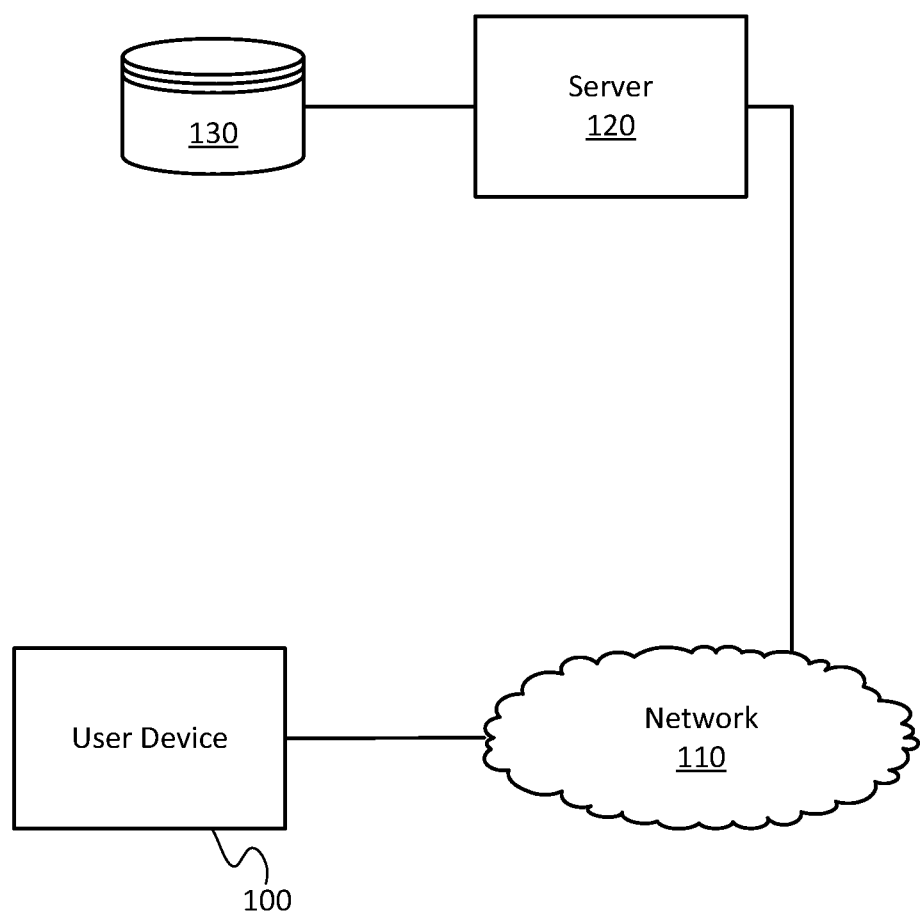
FIG. 1 illustrates a system for generating a map including path side imagery.

FIG. 1 illustrates a system 150 for generating a map including path side data or imagery. The system 150 includes a user device 100, a network 110, a server 120, and a geographic and/or map database 130. The geographic database 130 may be maintained by a map developer, such as NAVTEQ North America, LLC located in Chicago, Ill. The map developer may collect geographic data to generate and enhance the geographic database 130. The user device 100 may be a cellular telephone (smart phone), a personal digital assistant ("PDA"), a tablet computer, a laptop, a personal navigation device ("PND"), a personal computer or another computing device.

The system 150 receives path side data referenced to three-dimensional geographic coordinates, which is stored in the database 130. The database 130 or another location stores map data. The map data includes a plurality of nodes and a plurality of segments. The nodes represent intersections or intersection points of links or path segments, and the links or path segments represent any traversable path. For example, each link or path segment may correspond to a street, a road, a pathway, a pedestrian walkway, a train path, a waterway, or any other navigable pathway. The system 150 selects a segment from the plurality of segments in the map data. The segment may be selected based on a location of the user device 100. The segment may be selected based on a command from a user.

The system 150 may be configured to receive optical data. The optical data may be a depthmap generated from an optical distancing system. The optical distancing system may be a light detection and ranging (LIDAR) device, a stereoscopic camera, or a structured light device. The optical data may be created using any arbitrary viewpoint or perspective. The optical data may be generated for each panoramic image viewpoint and stored in the database 130. The optical data may include geo-coordinates such as latitude, longitude, and altitude for each of plurality of points.

The system 150 projects the optical data onto at least one two-dimensional plane. The two-dimensional plane may be parallel to the street, parallel to the associated path segment, and/or parallel to the direction of movement of the optical distancing system as the optical data is collected. The two-dimensional plane may be flat, curved, or parametric. The two-dimensional plane may be selected to estimate a building facade along the street.

The system 150 receives image data from at least one panoramic image or image bubble. The at least one image bubble may be collected by a camera. The image bubble may have a center point measured in Cartesian coordinates such as an X-coordinate, a Y-coordinate, and a Z-coordinate. Each point on the image bubble is defined by the center point and one or more angles (e.g., roll, pitch, yaw). By correlating the Cartesian space of the image bubble and the geo-referenced three-dimensional space of the optical data, the system 150 associates one or more points of the optical data with one or more pixels in the image bubble.

The two-dimensional plane is modified to illustrate path side imagery. Specifically, the pixel values of the image bubble are applied to the optical data projected onto the two-dimensional plane. In other words, the system 150 calculates a pixel value for each point of the optical data on the at least one two-dimensional plane. For example, the system 150 may colorize the optical data in the two-dimensional plane to resemble the path side imagery simulating the captured image of the image bubble.

The system 150 rotates the path side data based on the segment selected from the map data. The path side data or imagery is rotated to be coplanar with the map data or map image. In other words, the two-dimensional plane including path side data, which is defined perpendicular to the map, is rotated and overlaid on the map. For example, the map may include a graphical model of roads (such as Fake Rd., Green St., Blue Ave., Airport Rd., $2^{nd}$ St., Main St., $1^{st}$ St., Maple Ave, and/or other roads or paths), points of interest (such as an airport, a park, or a building), and other geographic or map features. The map is or is not photo/video imagery data. For example, the map is a vector-based (e.g., SVG format), raster or pixel based, tile-based, or other type of graphical map model or representation. For example, the roads in the map are displayed based on map data, such as a road segment and corresponding nodes. Graphical representations of the map are generated and/or displayed based on such map data. The map may be displayed in a 2D (such as a bird's eye view), 2.5D (such as a perspective view), or 3D view.

The system 150 outputs the path side data and a portion of the map data to a display or an external device. Alternatively or in addition, the system 150 may store the image file including the map and the points projected from the optical data and having pixel values defined by the image bubble in the database 130. The pixel values may include one or more of a color, a hue, a brightness, a luminance, and an intensity of the pixel.

Figure 2:
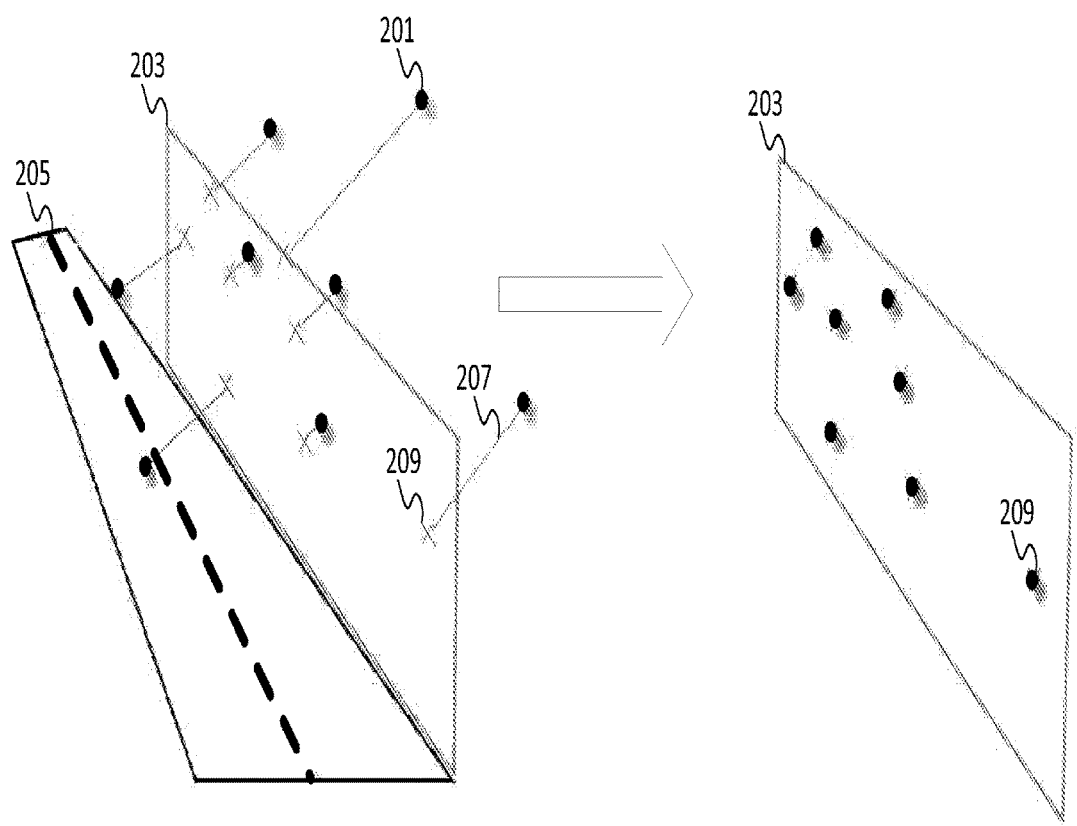
FIG. 2 illustrates the projection of optical data on a two-dimensional plane.

FIG. 2 illustrates the projection of optical data 201 on a two-dimensional plane 203. The optical data 201 may be generated by an optical distancing system that employs one or more lasers to collect data points representing an area, such as an area about a road 205, walkway, or other pathway. Software generates the optical data based on the measured distance, the location of the optical distancing system, which may be on a moving platform such as a car (or Segway, animal, pedestrian, or other vehicle or object), and the angle of the laser. Optical distancing systems include LIDAR, a stereoscopic camera, a time of flight infrared camera, and a structured light device.

A LIDAR device collects and gathers data points in a point cloud in which each data point corresponds to a local coordinate, such as (x, y, z). The LIDAR data may be a grayscale point cloud including an intensity for each data point, ranging from 0 for black to 255 for white or vice versa. The point cloud may be stored in ASCII or LIDAR exchange format. The one or more lasers may be in a near infrared spectrum (such as about 700 nm to about 5000 nm or about 800 nm to about 2500 nm) or other light spectrum.

The view on the left side of FIG. 2 illustrates the optical data in the geographically referenced three-dimensional space. The orthogonal lines 207 show the projection of the optical data onto the two-dimensional plane 203. The projection may be an orthographic projection or any other type of projection for representing three-dimensional points in two dimensions. The orthographic projection is defined as any parallel projection, including projection lines (e.g., orthogonal lines 207) perpendicular to the projection plane (e.g., two-dimensional plane 203), which preserves a relationship between the original points. The orthographic projection may include exactly one translation and one linear transformation for each point. The view on the right side of FIG. 3 illustrates the two-dimensional plane 203 including the projected optical data 209.

Figure 3:
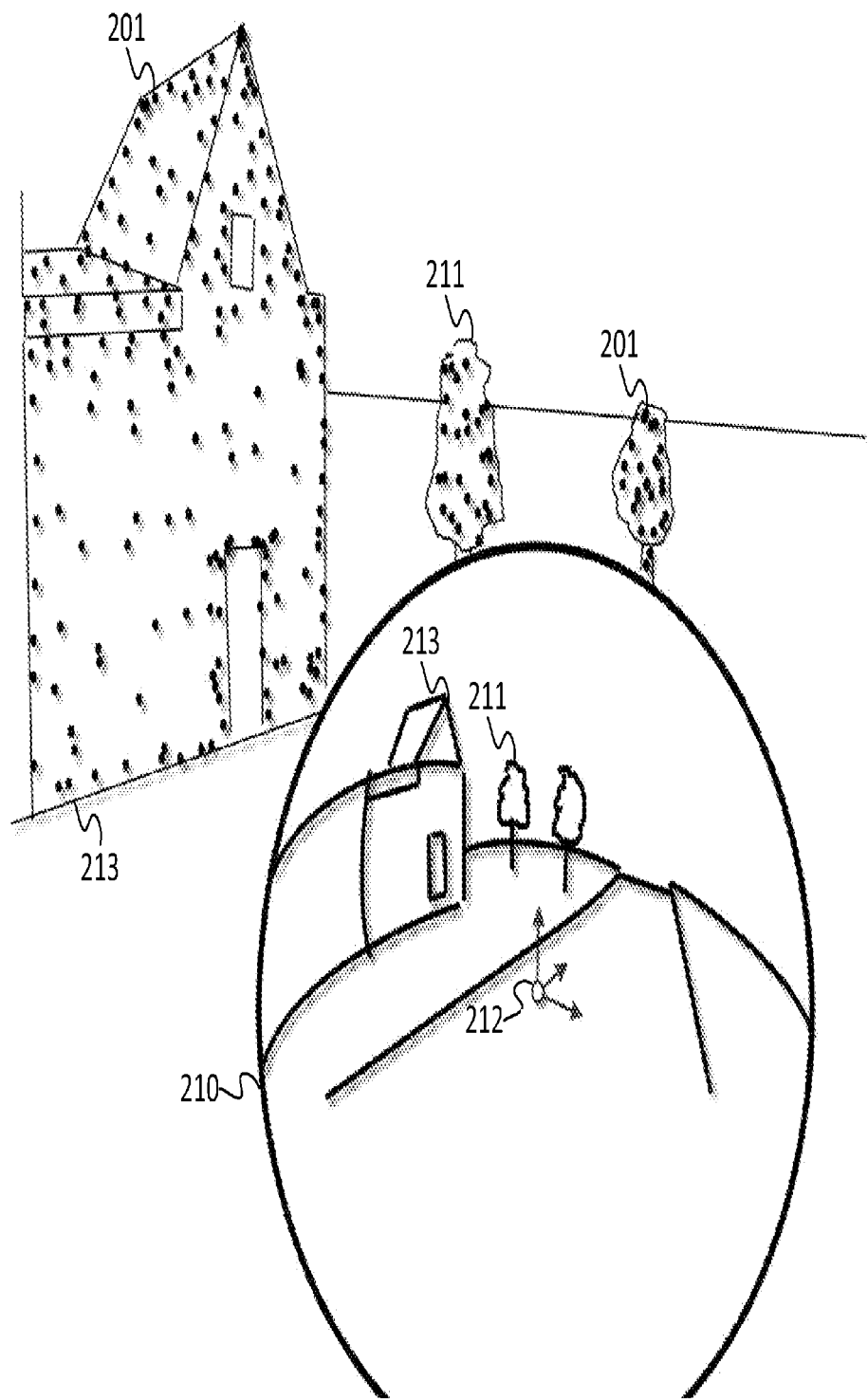
FIG. 3 illustrates a view correlating the optical data to an image bubble.

FIG. 3 illustrates a view correlating the optical data 201 to an image bubble 210. The geo-referenced three-dimensional space of the optical data 201 is shown on a real world scene including a building 213 and trees 211. The optical data 201 is aligned with the Cartesian space of the image bubble 210 as shown by Cartesian axes 212. The alignment may be calculated using an orientation quaternion. An orientation quaternion may be defined as a four element mathematical notation for describing a rotation. The orientation quaternion may describe the rotation from the geo-referenced three-dimensional space to the Cartesian space or vice versa.

Figure 4:
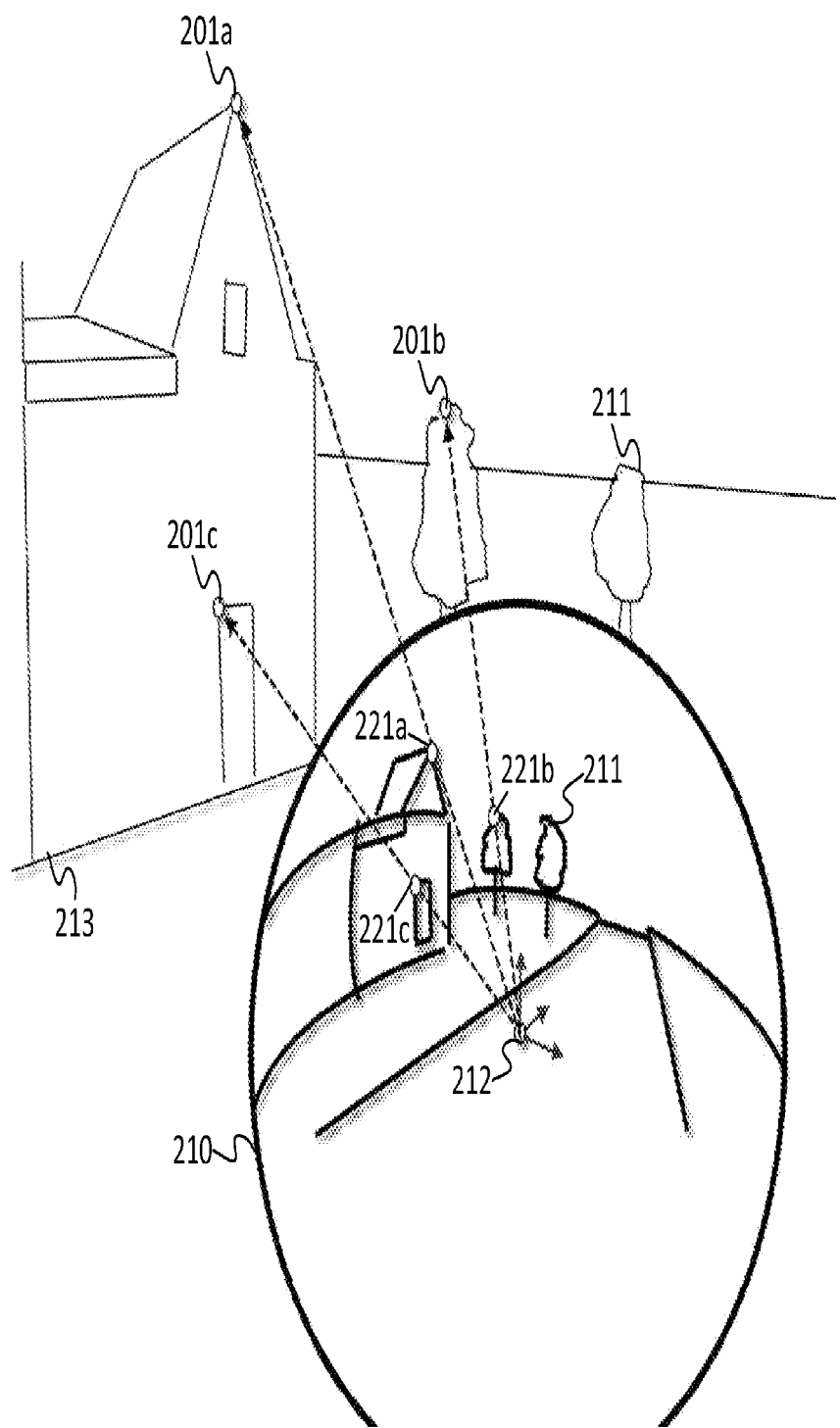
FIG. 4 illustrates another view correlating the optical data to the image bubble.

FIG. 4 illustrates another view correlating the optical data 201 to the image bubble 210. Individual portions of the optical data 201 correspond to pixels of the image bubble 210. For example, a first pixel 221*a* in the image bubble 210 near the top of building 213 corresponds to a first optical datum 201*a*, a second pixel 221*b* in the image bubble 210 on the tree 211 corresponds to a second optical datum 201*b*, and a third pixel 221*c* in the image bubble 210 near the door of building 213 corresponds to a third optical datum 201*c*.

One or more pixel values from the image bubble 210 are applied to one or more data points in the optical data 201. In some implementations, there is a one to one ratio in the application of pixel values from the image bubble 210. For example, a pixel value from the first pixel 221*a* is stored in the two-dimensional plane 203 in association with the first optical datum 201*a*, a pixel value from the second pixel 221*b* is stored in the two-dimensional plane 203 in association with the second optical datum 201*b*, and a pixel value from the third pixel 221*c* is stored in the two-dimensional plane 203 in association with the third optical datum 201*c*. In other implementations, a group of pixels in the image bubble 210 may be applied to one data point in the optical data 201. The pixel values of the group of pixels may be averaged to select the new value of the data point in the optical data 201. Alternatively, the median pixel value of the group of pixels may be used or the pixel values may be weighted according to the location (e.g., the weight of each pixel may be inversely proportional to the distance from the center of the group of pixels).

In other implementations, a group of pixels in the image bubble 210 may be applied to an area surrounding a data point in the optical data 201. The group of pixels in the image bubble 210 may be referred to as an image splat. A larger section of image data is cut from image bubble 210 and applied to the two-dimensional plane. The size of the section of image data may be measured in pixels. The size of the section of image data may be a function of the location of the data point in the optical data 201. Data points farther from the perspective of the user may be associated with a smaller number of pixels from the image bubble 210 and data points closer to the perspective of the user may be associated with a larger number of pixels from the image bubble 210. In another example, size of the section of image data may be a function of the length of orthogonal line 207 associated with the particular data point in the optical data.

In another example, a single pixel value from the image bubble 210 may be applied to multiple data points in the optical data 201. Across the two-dimensional plane any combination of these algorithms may be used. The selection of the algorithm may be dependent on the density of the optical data 201, which may vary significantly, as shown by FIG. 3. Interpolation may be used to obtain a continuous set of optical data 201.

In another implementation, the color may be generated entirely based on the depth information without using the image pixels. For example, the color may be based on depth change to indicate edge outlines. This method is used to generate a gray scale silhouette or line based street side view scene. In another mode, the edge color may be mixed with the image pixels to create an image based street side scene with enhanced edges.

The pixel values may specify color. The pixel values may include a red value, a green value, and a blue value, referred to collectively as a RGB value. Alternatively, the pixel values may be grayscale. The resulting "image" in the two-dimensional plane 203 is a collection of colorized optical data. In addition or in the alternative, the pixel values may specify a hue, a brightness, a luminance, and/or an intensity of the pixel. Hue may be defined as the degree to which a stimulus can be described as similar to or different from the unique hues (red, blue, green, yellow). Brightness may be defined as the degree to which the pixel appears to be radiating or reflecting light. Likewise, luminance may be defined as a measurement of the luminous intensity per unit area of light (e.g., candela per square meter). Intensity may be defined as lightness, amplitude, color value, color tone, or any description that relates to the subjective perception of human being on the lightness-darkness axis as described by a color model. Any of the above quantities may be described by the Lab color model, the hue, saturation, lightness (HSL) color model, or the hue, saturation, and value (HSV) color model.

Figure 5:
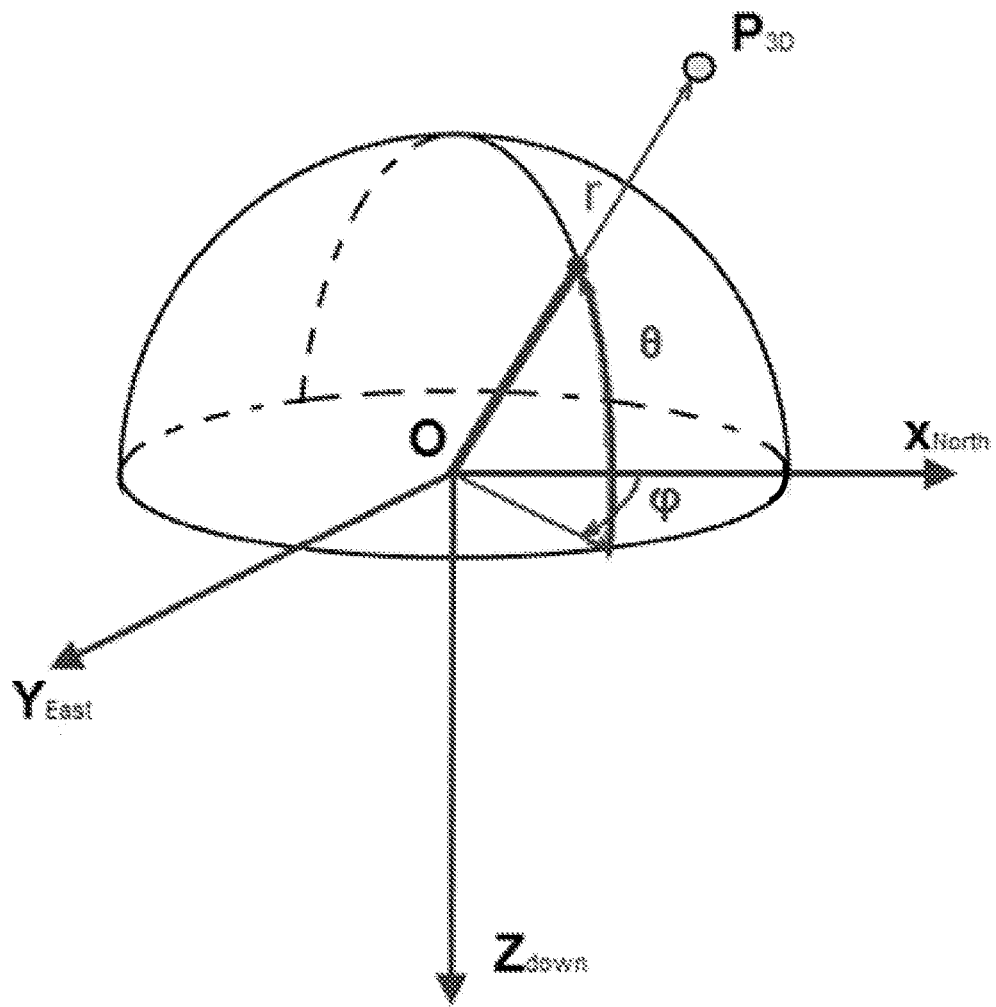
FIG. 5 illustrates mapping the optical data to an image bubble.

FIG. 5 illustrates mapping the optical data 201 to an image bubble 210. The process may inversely involve the mapping of spherical coordinates of the image bubble 210 to the geographical coordinate space of the optical data 201. Through geometry, an example point ($P_{3D}$) in the optical data 201 may be referenced as a vector extending from the center point (O) of the image bubble 210 having radius (r). The normalized vector includes an X-coordinate ($V_x$) a Y-coordinate ($V_y$), and a Z-coordinate ($V_z$). The vector, or a line extending in the direction of the vector, intersects the image bubble 210. The pixel values at or near the intersection of the vector and the image bubble 210 are stored as the two-dimensional plane 203. Equations 1 and 2 provide an example calculation for mapping the example point $P_{3D}$ to the spherical coordinates ($\theta$, $\phi$) from which the pixel value is determined. The spherical coordinates may be converted to image pixel coordinates based on the image dimensions (i.e., the number of pixels in the image).

$$\phi = \arctan(-Vy/Vx) \qquad \text{Eq. 1}$$

$$\theta = \arcsin(-Vz) \qquad \text{Eq. 2}$$

Figure 6:
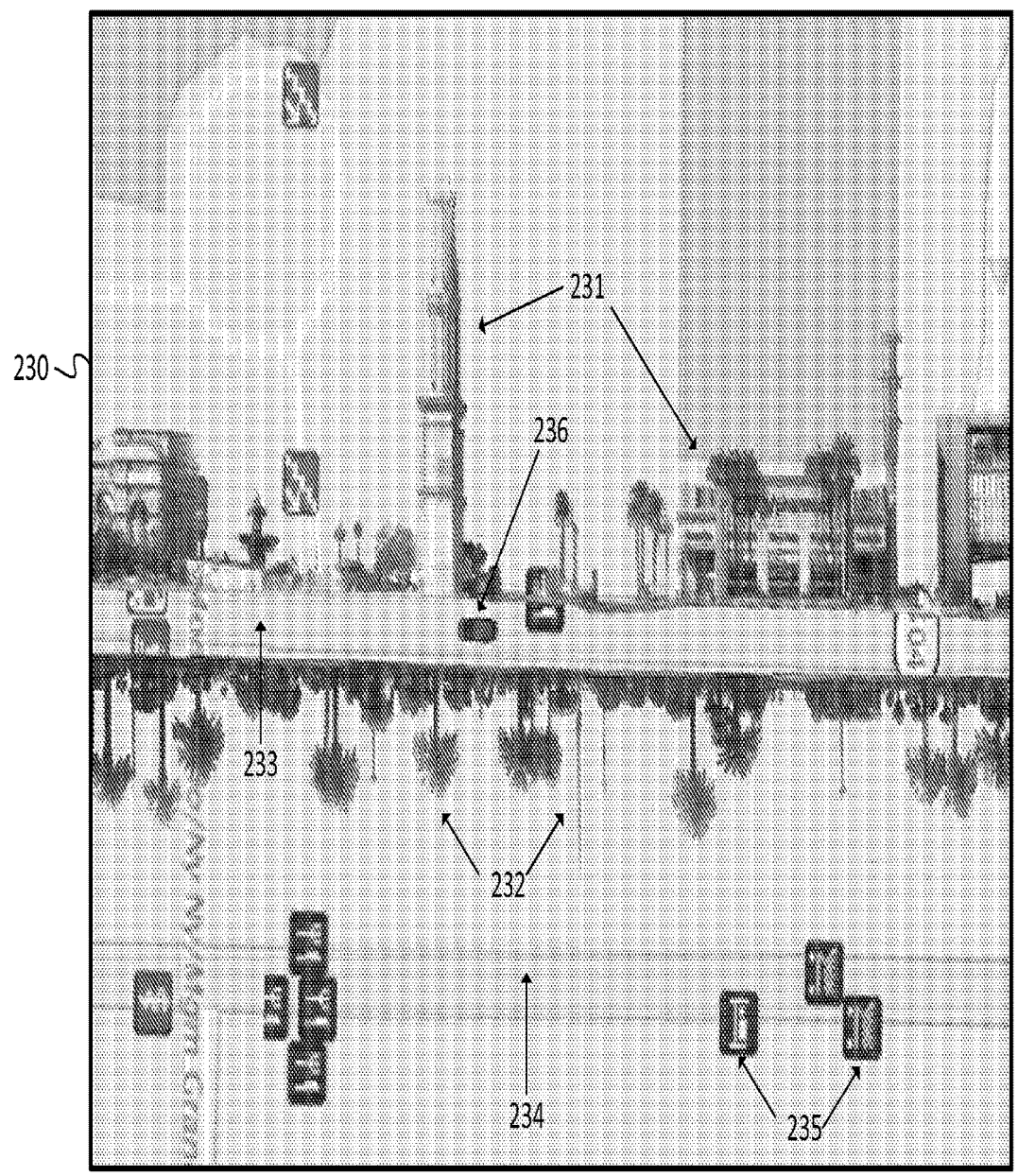
FIG. 6 illustrates a map including orthographic path side imagery.

FIG. 6 illustrates a map 230 including path side data or imagery in an orthographic projection. The path side data include a first portion 231 on one side of the path and a second portion 232 on the other side of the path. Each portion may be projected onto a two-dimensional plane and determined according to respective panoramic images as discussed above. Further, each portion is rotated approximately 90 degrees or otherwise overlaid on the map 230 adjacent to the path segment 233. The first portion 231 may coincide with a geographical direction, which determines placement on the map 230. For example, the first portion 231 is shown adjacent to the path segment 233 on the north side of the path segment. Similarly, the second portion 232 may coincide with the south side of the path segment 233 and be placed adjacent and to the south of the segment 233 in the map 230.

Figure 7A:
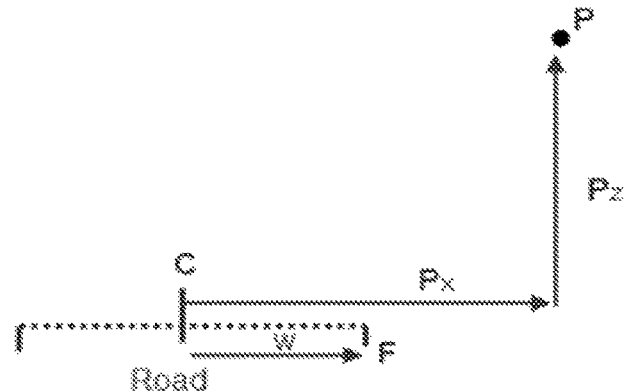
FIGS. 7A and 7B illustrate a rotation of path side data.
Figure 7B:
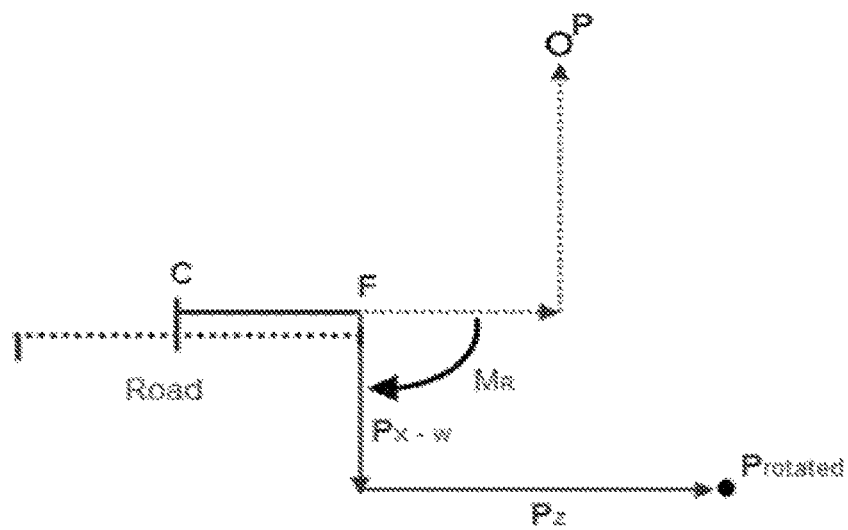

FIGS. 7A and 7B illustrate an example rotation of the path side data. An original point P is a three-dimensional optically measured point (optical data). The point P may represent a building or another object. The road or path shown in FIGS. 7A and 7B runs into the page and the view of FIGS. 7A and 7B is horizontal along the road or path.

Rotation point F illustrates the axis about which the path side data is rotated or folded. The rotation point F may be defined based on the road width W. The rotation point F may be calculated as F=C+WN, where N is a unit vector normal to the road or path direction. Alternatively, the rotation point F may be calculated based on the optical data to identify a feature such as a curb or building façade.

The path side data may be rotated using a rotation matrix, a rotation vector, or a rotation quaternion. FIG. 7B illustrates the rotation of point P using a rotation matrix $M_R$ to $P_{rotated}$. The rotation matrix $M_R$ may be defined by a rotation axis tangent to the road or path direction. As shown by Equation 3, the rotated point of any three-dimensional point of the path side data is based on the rotation point F and the rotation matrix $M_R$.

$$P_{rotated} = M_R * (P - F) + F \qquad \text{Eq. 3}$$

Equation 3 further illustrates that the rotation about rotation point F is performed by first shifting rotation point P to the origin (P−F), and subsequently rotating the shifted point according to the rotation matrix $M_R$, and finally reversing or undoing the shift with the term (+F).

For a rotation of 90 degrees to align the path side data to be coplanar with the map data, the rotation matrix $M_R$ may be:

$$M_R = \begin{bmatrix} 0 & -1 & 0 \\ 1 & 0 & 0 \\ 0 & 0 & 1 \end{bmatrix}$$

Additionally, general rotation matrices for rotating the path side data any combination of three axial angle rotations $\theta_x$, $\theta_y$, $\theta_z$ include a plurality of rotation matrices $R_x$, $R_y$, and $R_z$. The result of successive rotations may be is any order such as R=Rx*Ry*Rz $$Rx = \begin{bmatrix} 1 & 0 & 0 \\ 0 & \cos\theta_x & \sin\theta_x \\ 0 & -\sin\theta_x & \cos\theta_x \end{bmatrix},$$

$$Ry = \begin{bmatrix} \cos\theta_y & 0 & -\sin\theta_y \\ 0 & 1 & 0 \\ \sin\theta_y & 0 & \cos\theta_y \end{bmatrix},$$

$$Rz = \begin{bmatrix} \cos\theta_z & \sin\theta_z & 0 \\ -\sin\theta_z & \cos\theta_z & 0 \\ 0 & 0 & 1 \end{bmatrix}.$$

The placement on the map 230 of the first portion 231 and the second portion 232 may be dependent on the travel of the vehicle 236, which includes the user device 100. For example, the first portion 231 may be shown to coincide with the right side of the vehicle 236 and the second portion 232 may be shown to coincide with the left side of the vehicle 236. As shown in FIG. 6, the vehicle 236 travels from right to left. If the vehicle 236 travels from left to right, the first portion 231 coincides with the left side of the vehicle 236, and the second portion 232 coincides with the right side of the vehicle 236. In other words, the placement of the path side data may also be dependent on the location and/or movement of the user device 100.

The map 230 may also include additional path segments, such as path segment 234. In one implementation, additional path side data or imagery corresponding to path segment 234 may be included on map 230. The map 230 may also include point of interest data or icons 235. Among other things, the point of interest data may indicate shopping, restaurants, lodging, hospitals, and public transportation.

The computing resources necessary for generating a map including path side data or imagery may be divided between the server 120 and the user device 100. In some embodiments, the server 120 performs a majority of the processing ("server-based embodiments"). In other embodiments, the user device 100 performs a majority of the processing ("user device-based embodiments").

For navigation related applications, the user device 100 may generate a location according to the geographic location of the user device 100. The location may be generated using positioning circuitry including one or more of a global navigation satellite system based on a satellite signal, a triangulation system that utilizes one or more terrestrial communication signals, a inertial position system based on sensors such as gyroscopes or accelerometers, and/or a dead reckoning system based on a previously known position. The positioning circuitry may also determine an orientation using any of the above systems and/or a magnetic sensor such as a compass. The orientation and the location allow the appropriate depthmap and panoramic image to be selected based on the perspective of the user at the current geographic location of the user device 100.

The network 110 may include any combination of a cellular network, the Internet, or a local computer network. For example, the user device 100 may communicate with the network 110 wirelessly though protocols known as Wi-Fi, the protocols defined by the IEEE 802.11 standards, the protocols defined by the Bluetooth standards, or other protocols. Alternatively or in addition, the user device 100 may communicate with the network 110 wirelessly as a cellular network such as a Global System for Mobile Communication (GSM) or other third generation (3G) or fourth generation (4G) networks.

The optical distancing system may be a LIDAR device, a stereoscopic camera, a time of flight camera, a structured light device, or another device. In the example of a LIDAR device, one or more (e.g., 1, 2, 10) lasers rotate in a plane. The optical distancing system may be coupled with an inertial measurement unit (IMU) to associate the optical distance data with the geo-located position of the optical distancing system.

The optical distancing system measures the distance from the optical distancing system to the various objects. In another example, the structured light device emits light onto objects and a camera captures images the structured light to determine distance based on the shape of the light in the captured images. The structured light may be infrared light or another light spectrum not visible to humans.

Figure 8:
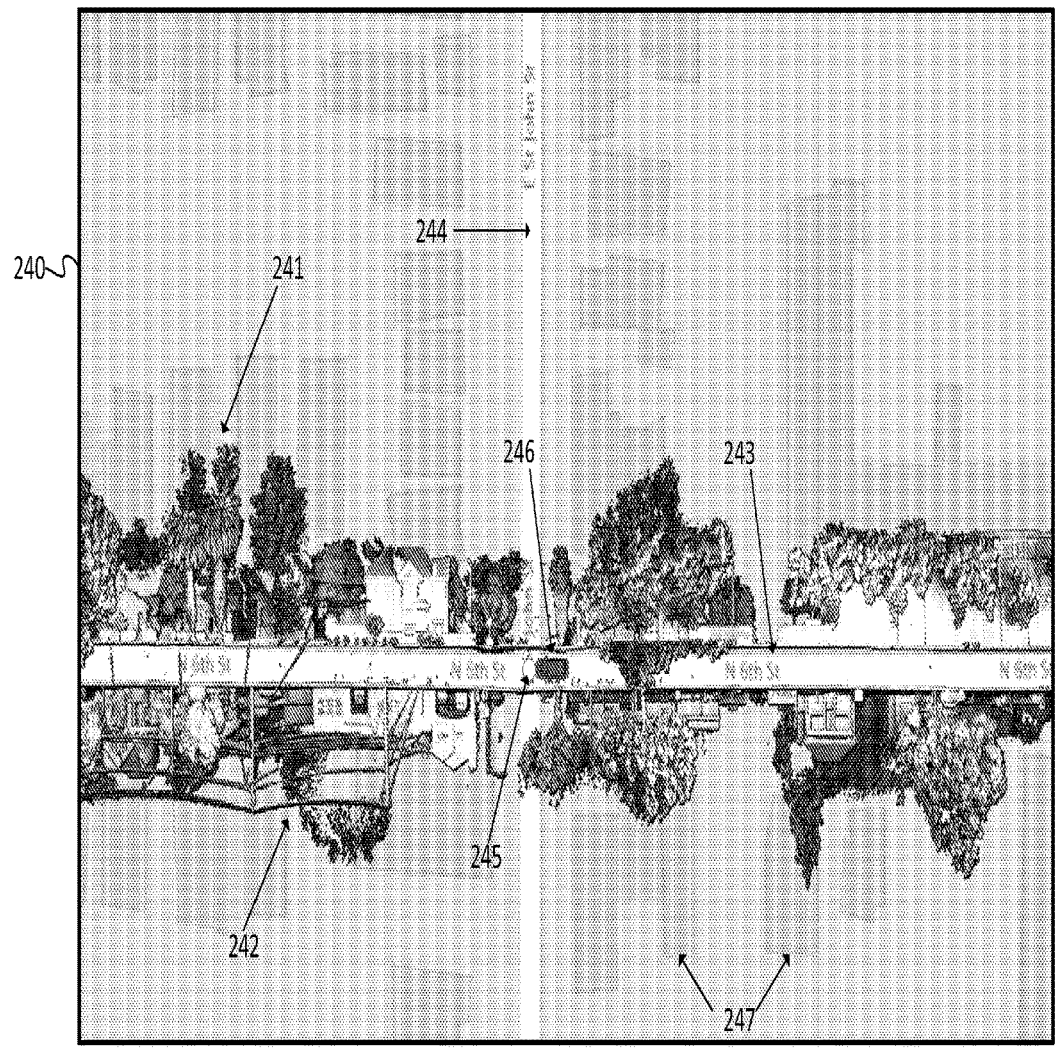
FIG. 8 illustrates another map including path side imagery.

FIG. 8 illustrates another map 240 including path side data or imagery. The path side data or imagery may also be divided into a first portion 241 on one side of the path segment 243 and a second portion 242 on another side of the path segment 243. The map 240 may also include building footprints 247. The building footprints 247 are substantially aligned with the buildings shown in the path side data or imagery. The vehicle 246 is nearing the node 245 which corresponds to the intersection of path segment 243 and path segment 244.

In navigation applications, the vehicle 246 may include the user device 100. When the vehicle 246 turns from path segment 243 onto path segment 244, the path side data for the first portion 241 and the second portion 242 is removed from the map 240. Path side data that corresponds to the path segment 244 is added to the map 240.

Figure 9:
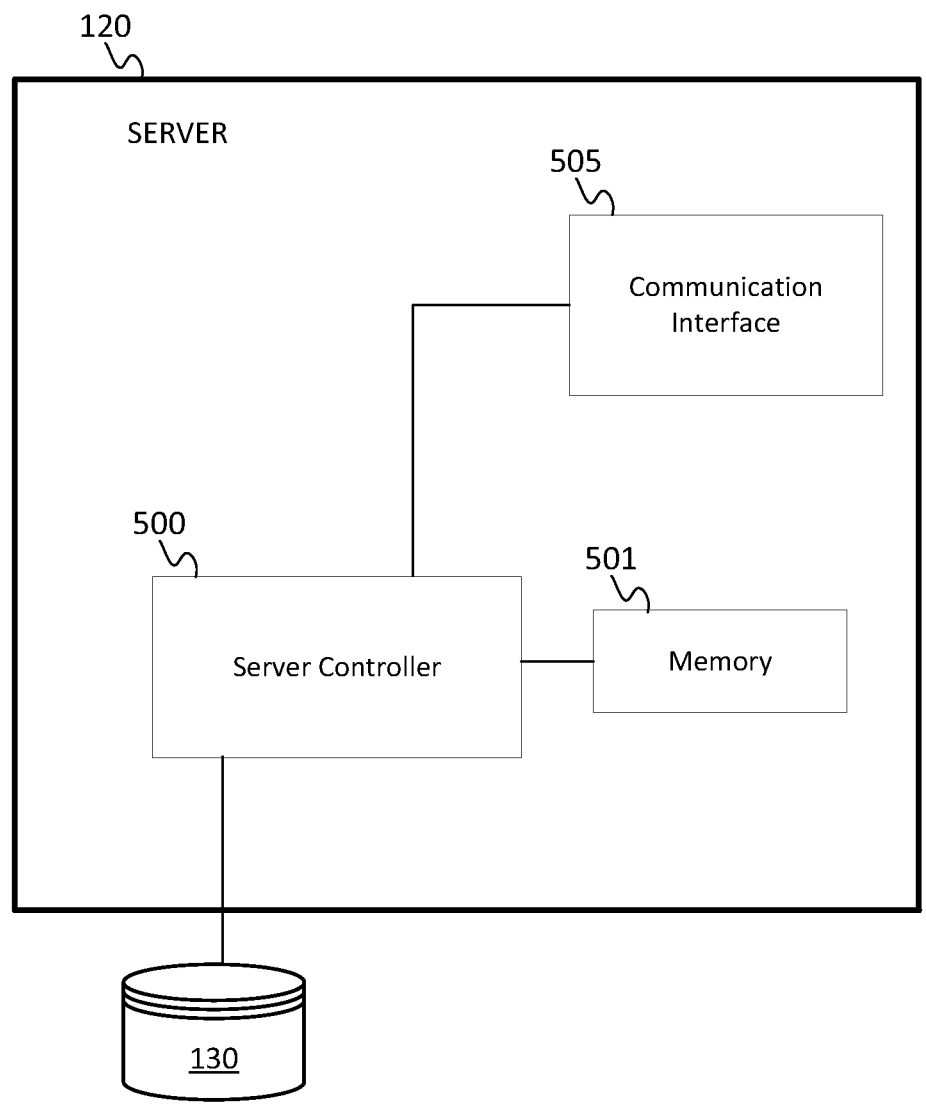
FIG. 9 illustrates a detailed view of the server of FIG. 1.

FIG. 9 illustrates a detailed view of the server 120 of FIG. 1. The server 120 includes a server controller or circuitry 500, a memory 501, and a communication interface 505. The database 130 may be external or internal to the server 120. In the server-based embodiments, the server 120 is an apparatus for generating a map including path side data or imagery.

Figure 10:
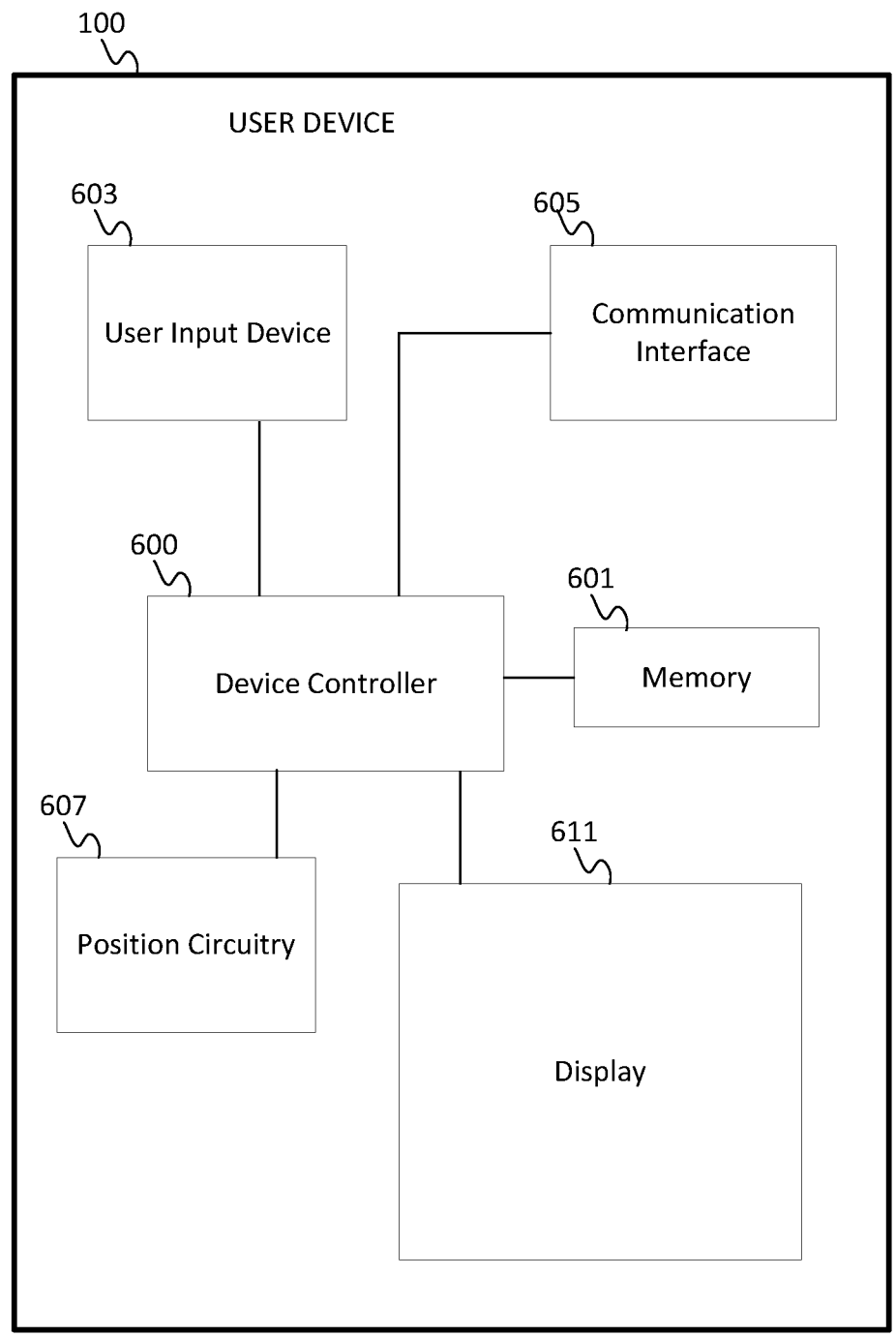
FIG. 10 illustrates a detailed view of the user device of FIG. 1.

FIG. 10 illustrates a detailed view of the user device of FIG. 1. In the user device-based embodiments, the user device 100 is an apparatus for generating a map including path side data or imagery. The user device 100 includes a user device controller or circuitry 600, a memory 601, a communication interface 605, and position circuitry 607. The user device 100 may also include a user input device 603 and a display 611.

The server processor 500 or another computing device is a processor configured to rotate the path side data based on a segment selected from the map data and generate an image including the path side data and at least a portion of the map data. The server processor 500 may calculate the rotation using a rotation matrix or a rotation quaternion. In navigation related applications, the segment is selected based on the location of the user device 100. Otherwise, the segment may be selected by the user or the routing algorithm. The communication interface 605 is configured to receive map data from a map database. The map data includes a plurality of nodes and a plurality of segments. The database 130 is a memory configured to store path side data referenced to three-dimensional geographic coordinates.

The server processor 500 is also configured to project optical data through geometrical calculations. As shown in FIG. 2, the optical data is projected onto two-dimensional plane 203 along an orthogonal line 207. The server processor 500 generates the path side data by defining a pixel value for a point of the optical data on the two-dimensional 203 plane according to image data from at least one panoramic image. In other words, the server controller 500 utilizes the perspective of the image bubble and the geo-referenced location of the optical data to select a color or other graphical attribute for the corresponding point in the two-dimensional plane.

The server controller 500 may store the two-dimensional plane including the colorized optical data in database 130 in the format of an image file. The format may be a bit map, a portable network graphics (PNG) file, a lossy compression graphics file, or other format. The two-dimensional plane including the colorized optical data may be assigned to a navigation link or segment, point-of-interest (POI), location reference object (LRO), node, and/or another type of route/map data.

The route data may be calculated from an origin point to a destination point by the server controller 500 or externally. The route data includes nodes, which represent intersections or intersection points, and links or path segments, which connect the nodes. The route data may be stored in a geographic database (e.g., database 130) in a spatial format (e.g., Oracle spatial format), which is maintained by the map developer and compiled into a delivery format (e.g., geographical data file (GDF) format).

The route data may be defined by a routing algorithm based on a Dijkstra method, an A-star algorithm or search, and/or other route exploration or calculation algorithms. Various aspects, such as distance, non-navigable areas, costs, and/or restrictions, are considered to determine an optimum route. The routing algorithm may be specific to pedestrian routing. The routing algorithm may rank links or segments according to suitability for traversal by pedestrians. For example, links or segments may be classified according to a plurality of pedestrian modes, including walking, bicycle, and wheelchair.

The apparatus for generating a map including path side data or imagery may operate with or without position data for the current location of the user device 100. When the position data is used in the server-based embodiments, the position circuitry 607 determines a current geographic position of the user device 100 and the communication interface 605 sends the current geographic position to the server 120. When the position data is used in the user-device based embodiments, the position circuitry 607 determines location data including the position and/or the orientation of the user device 100. The location data may be generated using one or more of a global navigation satellite system based on a satellite signal (such as Global Positioning System (GPS), the Russian GLONASS or European Galileo), a triangulation system that utilizes one or more terrestrial communication signals, a inertial position system based on relative position sensors such as gyroscopes, accelerometers, and altimeters, and/or a dead reckoning system based on a previously known position. The orientation may be determined using any of the above systems and/or a magnetic sensor such as a compass or a three-dimensional magnetic sensor array. Magnetic sensors determine the direction and or strength of a magnetic field and can be used to determine heading or orientation. Inertial sensors such as accelerometers and gyroscopes measure acceleration, which can be used to calculate position, orientation, and velocity (direction and speed of movement) of the user device 100. The location and/or orientation data may be used to select the navigation segment associated with the two-dimensional plane from the database 130.

In the user device-based embodiments, the memory 601 is configured to store the optical data measured in three-dimensional geographic coordinates and image data from at least one image bubble. The device controller 600 may be configured to project the optical data onto at least one predefined two-dimensional plane and calculate a pixel value for a point of the optical data on the at least one predefined two-dimensional plane according to the image data using the algorithms discussed above. The device controller 600 is configured apply a rotation matrix or rotation quaternion to the path side data to rotate the path side data based on a segment selected from the map data and generate an image including the path side data and at least a portion of the map data.

The predefined two-dimensional plane is converted to a format similar to an image. The image may be stored in memory 601 and displayed on display 611. The device controller 600 may generate an image file from the predefined two-dimensional plane and associate the image file with a navigation segment (the navigation segment may refer to data representing a road or path segment in a map database, a portion of a navigation route, and or any other geographical/navigation/map area or object). The user input device 603 is configured to receive a command indicative of the navigation segment. The command could be in response to the calculation of a route or route data. Alternatively, the command could be in response to selection of an address, a point of interest, a selection on a digital map, or manual selection of an image bubble.

The display 611 is configured to display street side imagery from the image file in response to the command. The display 611 may be combined with the user input device 603 as a touch screen, which may capacitive or resistive. In addition, the user input device 603 may include one or more buttons, keypad, keyboard, mouse, stylist pen, trackball, rocker switch, touch pad, voice recognition circuit, or other device or component for inputting data to the navigation device 100. The display 611 may be a liquid crystal display (LCD) panel, light emitting diode (LED) screen, thin film transistor screen, or another type of display.

The user device controller 600 or server controller 500 may include a general processor, digital signal processor, an application specific integrated circuit (ASIC), field programmable gate array, analog circuit, digital circuit, combinations thereof, or other now known or later developed processor. The user device controller 600 or server controller 500 may be a single device or combinations of devices, such as associated with a network, distributed processing, or cloud computing.

The memories 501, 601 may be a volatile memory or a non-volatile memory. The memory 501, 601 may include one or more of a read only memory (ROM), random access memory (RAM), a flash memory, an electronic erasable program read only memory (EEPROM), or other type of memory. The memory 501, 601 may be removable from the user device 100, such as a secure digital (SD) memory card.

The communication interfaces 505, 605 may include any operable connection. An operable connection may be one in which signals, physical communications, and/or logical communications may be sent and/or received. An operable connection may include a physical interface, an electrical interface, and/or a data interface. The communication interfaces 505, 605 provides for wireless and/or wired communications in any now known or later developed format.

In an alternative embodiment, the user device 100 may omit the position circuitry 607 or use of the position circuitry 607. In this alternative embodiment, the user device 100 may be a personal computer, which encompasses laptops and other mobile processing platforms.

Figure 11:
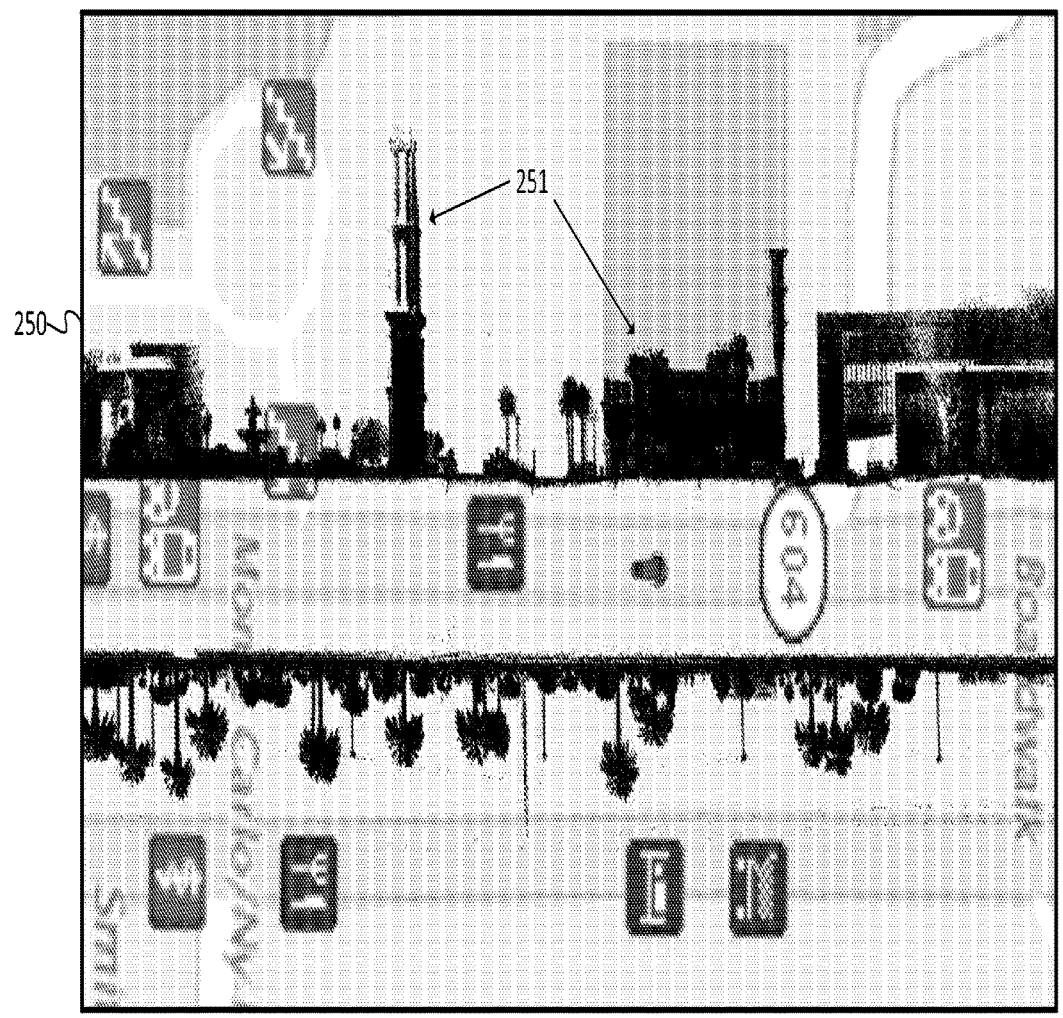
FIG. 11 illustrates a map including silhouettes of path side imagery.

FIG. 11 illustrates a map 250 including silhouettes 251 of path side imagery. The silhouettes are not colorized or otherwise defined from associated panoramic images. The silhouettes 251 are generated by assigning all projected optical data to the same pixel value. The optical data may be filtered to remove extraneous points. For example, the server processor 500 may be configured to generate the path side data by defining a pixel value for points of the optical data projected according to a predetermined pixel value. The pixel value may represent black.

Figure 12:
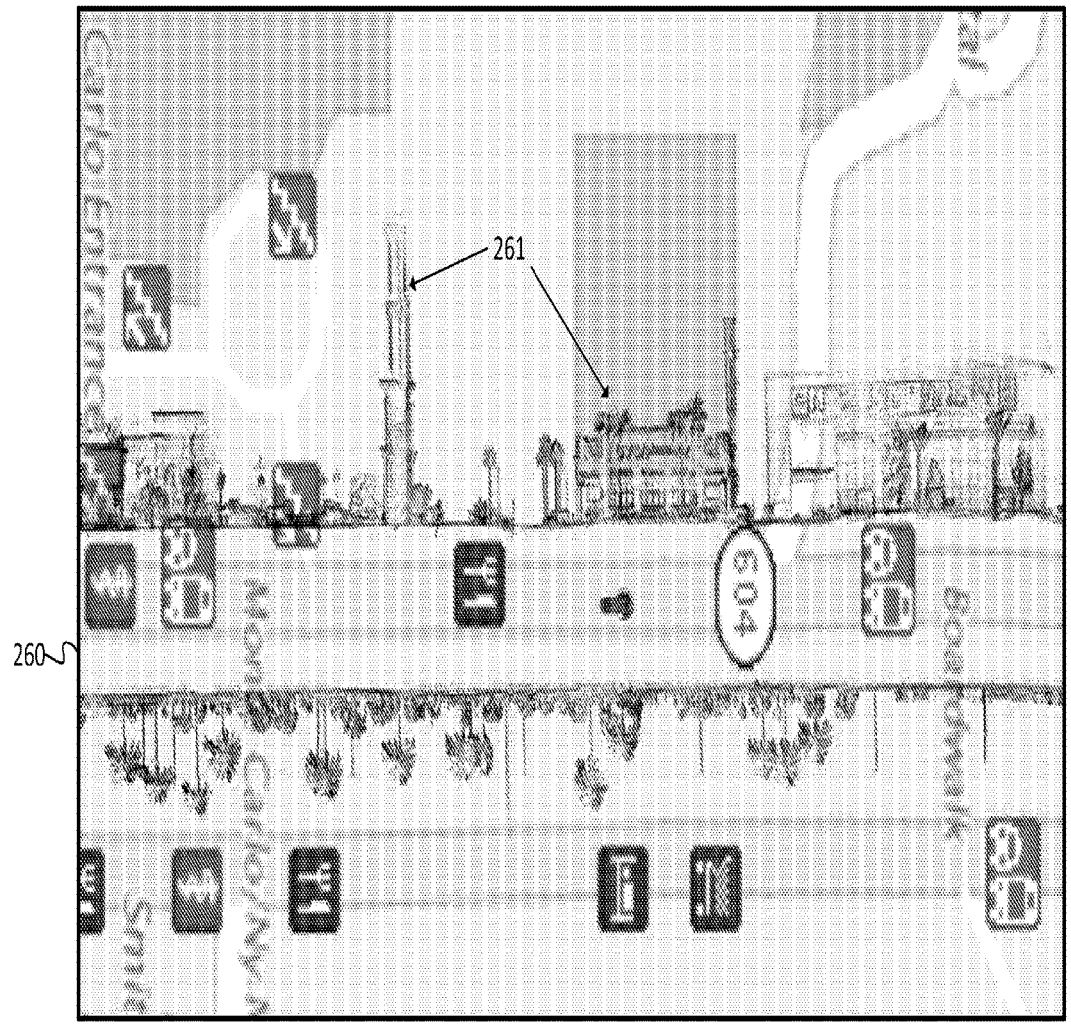
FIG. 12 illustrates a map including outlines of path side imagery.

FIG. 12 illustrates a map 260 including outlines 261 of path side imagery. The outlines 261 are not colorized or otherwise defined from associated panoramic images. Instead, the outlines 261 are calculated by filtering the optical data. For example, the trends in the optical data are analyzed to determine when an object ends or begins. A steep change in the depth in a series of optical data indicates the beginning or end of an object. In one example algorithm, the depth value for one point is subtracted from a subsequent point and the difference is compared with a threshold value. When the difference exceeds the threshold value, the controller sets a pixel value at that point to a predetermined value. As this process is repeated across the depthmap, outlines are drawn around buildings and other objects.

Figure 13:
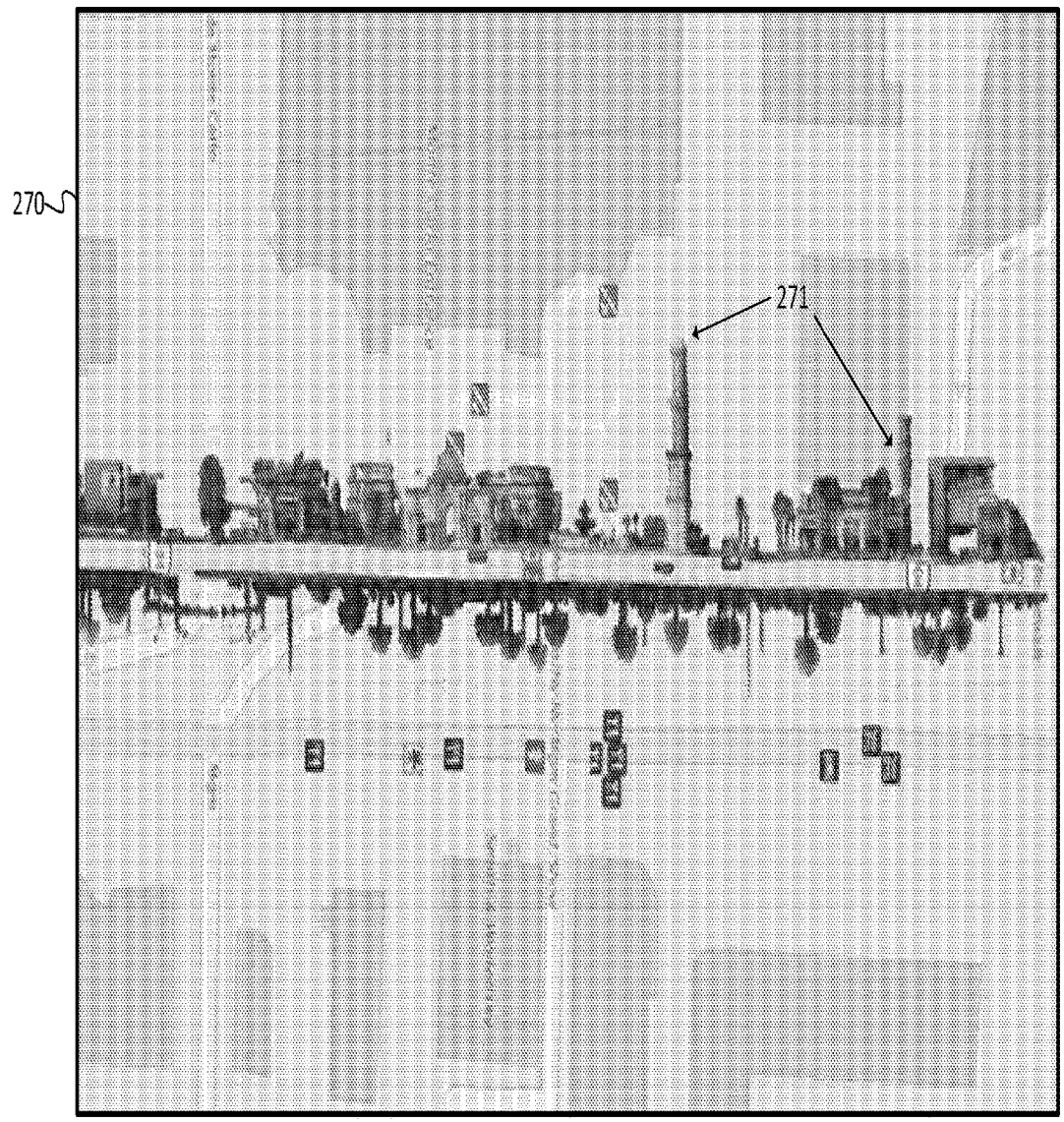
FIG. 13 illustrates a map including optical data of path side imagery.

FIG. 13 illustrates a map 270 including optical data 271 of path side imagery. The optical data may be generated from a light detection and ranging (LIDAR) device, a stereoscopic camera, or a structured light device. The optical data 271 is not colorized or otherwise defined from associated panoramic images. Features of objects are visible in the optical data because of the reflectivity of the object. The intensity values of the optical depend on the reflectivity of the objects. The path side data based on reflectivity has no natural lighting, no shadows, and may be collected in complete darkness. The path side data based on reflectivity highlights the architectural details of the building facade. The server controller 500 or device controller 600 may be configured to filter the optical data according to the reflectivity of the optical data and generate the path side data based on the filtered optical data.

Figure 14:
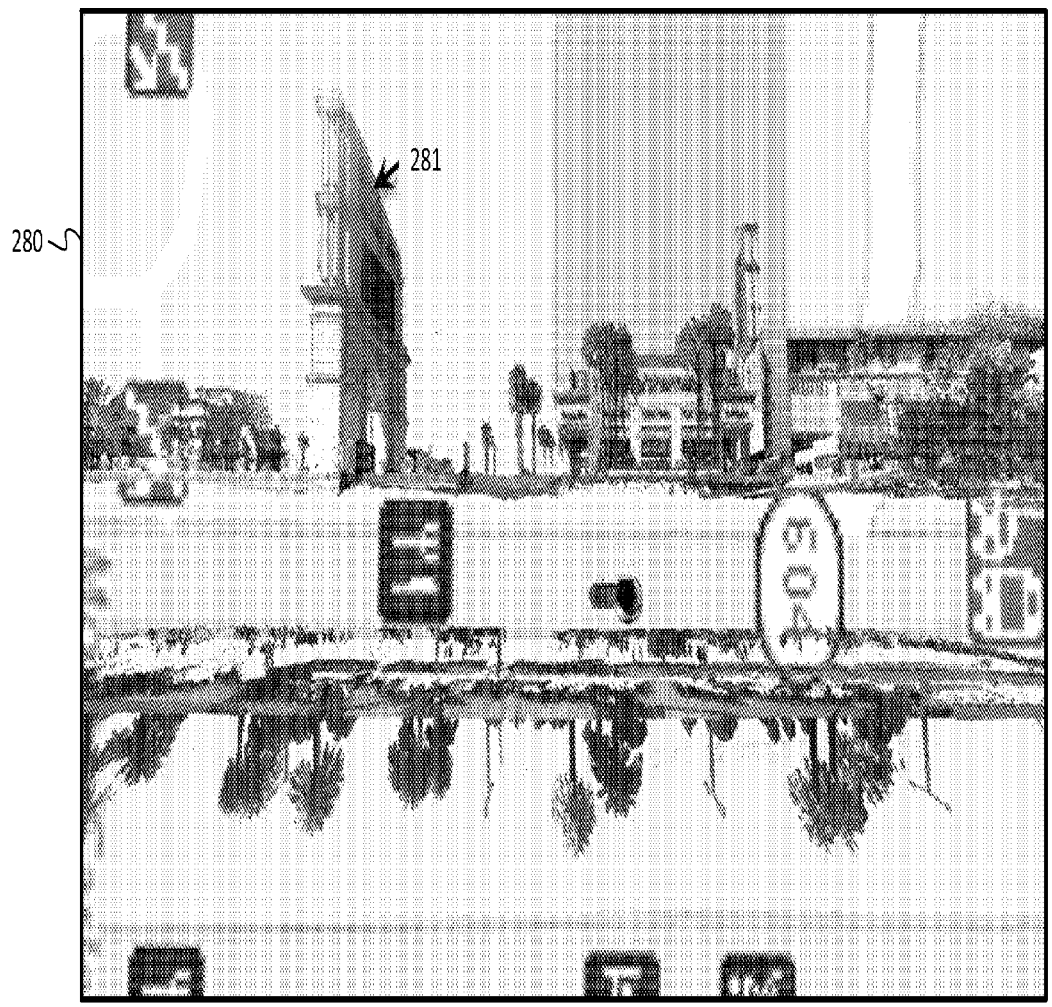
FIG. 14 illustrates a map including a perspective view of path side imagery.

FIG. 14 illustrates a map 280 including a perspective view 281 of path side imagery. To create the perspective view 281, the controller utilizes the depth values of the optical data. The optical data is projected onto a two-dimensional place, as discussed above, but projected using a standard perspective transformation instead of an orthographic projection. The perspective transformation draws objects smaller as the depth value is higher until reaching a vanishing point convergence maximum. The controller omits points with a depth value greater than the vanishing point convergence maximum. This provides a three-dimensional effect according to the depth values of the optical data.

The perspective view 281 may be constructed from a series of predetermined images. Each of the series of predetermined images is associated with a range of locations. For example, each image may be associated with one city block or 50 meters of a pathway. Seams between the images may be aligned based on objects in the foreground of the images.

The system 150 may project the optical data onto a plurality of predefined two-dimensional planes. The plurality of predefined two-dimensional planes may be defined by a distance range. For example, optical data from the center point to the curb of the street may be snapped to a first plane, optical data from the curb to just before the building facade may be snapped to a second plane, and optical data from the building facade and optical data farther from the center point may be snapped to a third plane. The system 150 may store an image file for each plane in the database 130. Each image file includes pixel values defined by the image bubble.

Figure 15:
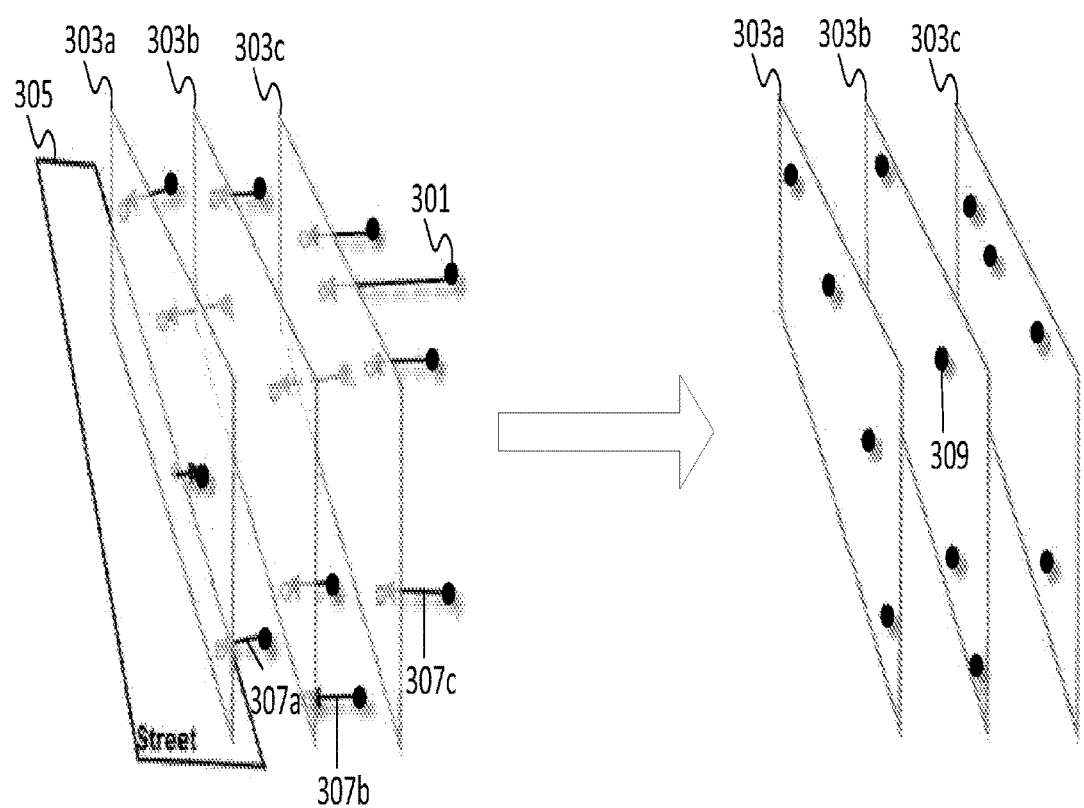
FIG. 15 illustrates the projection of optical data on layered two-dimensional plane.

FIG. 15 illustrates the projection of the optical data 301 on a plurality of two-dimensional planes 303a-c. The view on the left side of FIG. 15 illustrates the optical data 301 in the geographically referenced three-dimensional space. The plurality of two-dimensional planes 303 a-c may be defined in a variety of algorithms such as a distance algorithm, a statistical algorithm, an image processing algorithm, or a database algorithm. The orthogonal lines 307a-c show the projection of the optical data onto the two-dimensional planes 303a-c. The view on the right side of FIG. 15 illustrates the two-dimensional planes 303a-c including the projected optical data 309.

In the distance algorithm, the plurality of two-dimensional planes 303a-c are defined based on distance. Any number of planes may be used. The distance may be measured from the collection point of the optical data 201 and/or the collection point of the image bubble 210. The distance may be measured from another reference point. The first plane 303a may be associated with a first threshold distance (e.g., 1 m, 5 m, 10 m). Points within the first threshold distance are projected onto the first plane 303a. The second plane 303b may be associated with a second threshold distance (e.g., 2 m, 5 m, 10 m). Points farther from the center point than the first threshold distance but within the second threshold distance are projected onto the second plane 303b. The third plane 303c may be associated with a third threshold distance (e.g., 5 m, 10 m, 20 m). Points farther from the center point than the third threshold distance are projected on the third plane 303c. The projection of the optical data 201 to the two-dimensional planes 303a-c may be according to the processes discussed above with respect to FIG. 2.

The statistical algorithm may define the plurality of two-dimensional planes 303a-c according to the values of the optical data 201. For example, the optical data 201 may be divided into N groups of data. For example, if N=2, the optical data 201 is divided in half according to distance. A first half of the optical data 201 is projected onto a first plane, and a second half of the optical data 201 is projected onto a second plane. N may be any integer value and an amount of data equal to 100/N percent of the total optical data 201 is projected on each plane. Alternatively, the optical data 201 could be divided according to standard deviation, variance, or the rate of change of distance.

The image processing algorithm may define the plurality of two-dimensional planes 303a-c according to trends in the optical data 201. The trends may identify navigation features in the optical data. The navigation features may include one or more of a road surface, a curb, a sign, a parked car, or a building facade. For example, the optical data 201 may be analyzed to determine the location of a curb, a building facade, or another object in the data. The image processing algorithm divides the optical data 201 such that points from the road surface to the curb are snapped to the first plane 303a, points from the curb to just before the buildings are snapped to the second plane 303b, and points from the building facade and beyond are snapped to the third plane 303c.

The database algorithm may define the plurality of two-dimensional planes 303a-c according to a database of physical features, which may be included in the map database or geographic database 130. The physical features may be building footprints, the number of lanes or dimensions of the pathway, or any known reference points that define the location of the building facade. As discussed above, the path side data in the plurality of two-dimensional planes 303a-c are rotated to be aligned with map data. The rotation may be performed using a rotation matrix or rotation quaternion.

All of the points in the path side imagery are snapped, projected, or compressed into the discrete layers. Each layer has the same length dimension in the path side imagery but corresponds to different geographical distances in the image bubbles and, accordingly, in the real world. Therefore, as the path side imagery is scrolled to view the entire street, the layers may scroll at different rates. The different rates may be proportional to the ratio of the first threshold distance and the second threshold distance.

Further, the controller may assign transparency values to each point in the path side imagery. The transparency of pixels in one layer defines how much of a subsequent layer may be seen. The combined transparency of the layers defines how much of the map data behind the path side imagery is visible. Alternatively, the controller may calculate an opaqueness value for pixels of the path side imagery.

Figure 16:
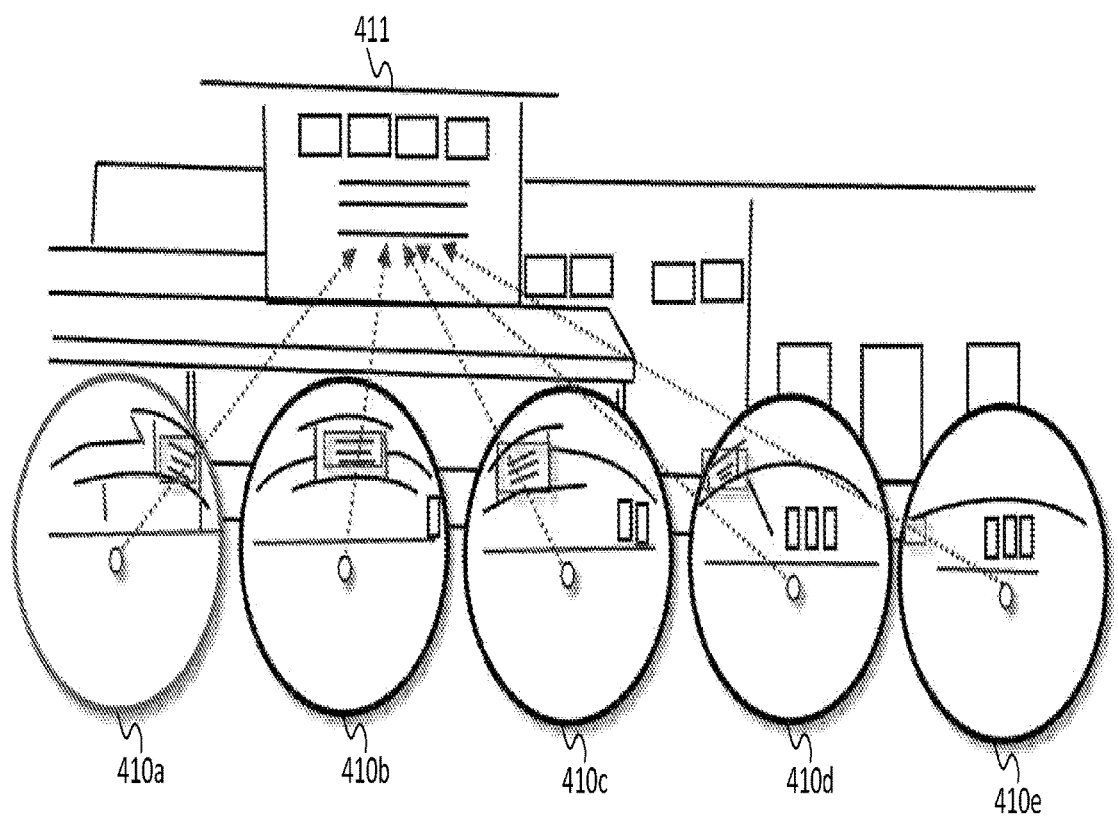
FIG. 16 illustrates a plurality of image bubbles correlated with path side imagery.

FIG. 16 illustrates a plurality of image bubbles 410a-e correlated with a street side view. Because of the panoramic nature of the image bubbles 410a-e, successive image bubbles overlap. That is, a single point in the real world, and accordingly in optical data 201, occurs in multiple image bubbles 410a-e. This principle is shown by building 411 in FIG. 16. Each of image bubbles 410a-e may provide a different perspective of building 411. Any of the algorithms for selecting the pixel values for the predefined two-dimensional plane, as described above, may be modified to include pixel values from a plurality of image bubbles. The pixel values from the plurality of image bubbles may be averaged. In other examples, pixel values from certain image bubbles may be ignored.

Figure 17:
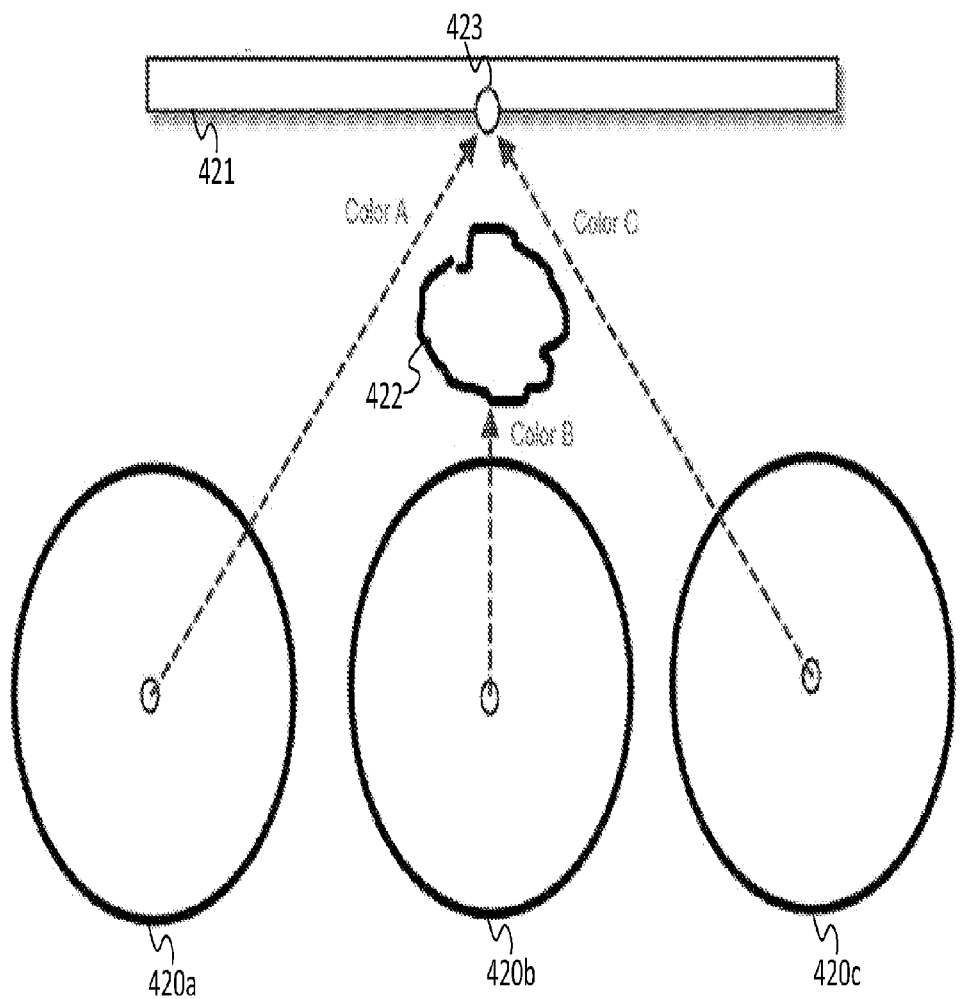
FIG. 17 illustrates an example obstruction using a plurality of image bubbles.

FIG. 17 illustrates an example obstruction 422 and multiple image bubbles 420a-c. The image bubbles 420a-c may include any number of image bubbles such as three, five, or ten image bubbles spaced at distance intervals (e.g., 1 m, 5 m, 10 m) or at time intervals of a moving camera. For a particular point 423 on the object 421, the associated pixel value in image bubble 420a is Color A, the associated pixel value in image bubble 420b is Color B, and the associated pixel value in image bubble 420c is Color C. Color A and Color C appropriately correspond to different perspectives of the particular point 423. However, Color B corresponds to obstruction 422 between the image bubble 420b and the object 421. If Color B was averaged or otherwise considered in the selection for the data point of the two-dimensional plane, the obstruction 422 would adversely affect the appearance of the street side image 401. Therefore, Color B may be ignored and Color A and Color C may be averaged. The system 150 may identify that Color B was caused by an obstruction, or otherwise erroneous, because Color B is an outlier. An outlier may be defined as a pixel value far away from the other pixel values from other image bubbles corresponding to the same point in the optical data 201. For example, any pixel value that is a predetermined number (e.g., 1, 2, 3) of standard deviations away from the mean pixel value may be considered an outlier. Alternatively, any pixel value that differs from the mean pixel value by minimum variation may be considered an outlier. For example, the minimum variation may be 50 or 100 on a 0 to 255 scale for pixel values. Example outliers 422 may be caused by light poles, moving cars, pedestrians, trees, leaves, or any object that may be between the building facade and the camera at some perspectives and not at others.

Figure 18:
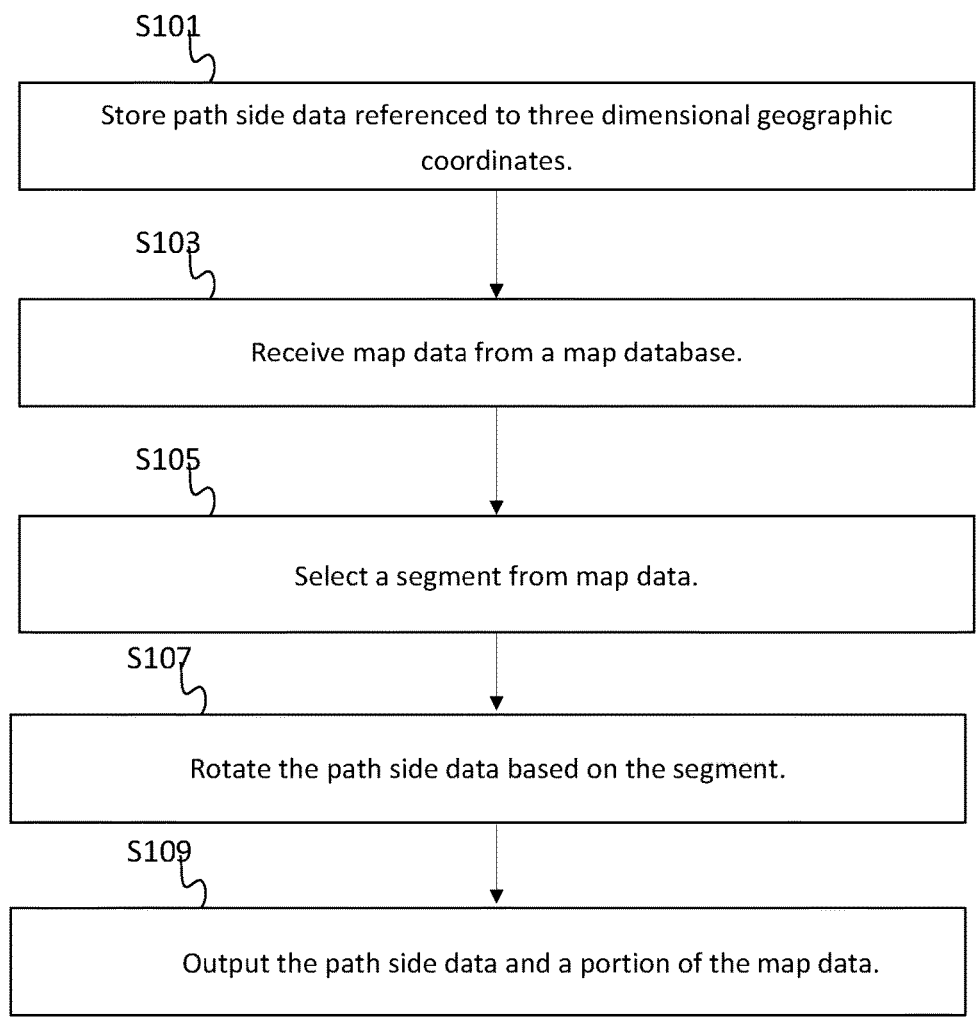
FIG. 18 illustrates a flowchart for generating a map including path side imagery.

FIG. 18 illustrates a flowchart for generating a map with path/street side imagery. Fewer, more, or different steps or acts may be provided, and a combination of steps may be provided. Also, the steps or acts may be performed in the order as shown or in a different order. The method is implemented by the system and/or devices described herein or by different devices or systems. One or more steps or processes of the method may be fully or partially automated (such as via a computer, processor, and/or algorithm).

At act S101, path side data referenced to three-dimensional geographic coordinates is stored. The path side data may be derived from optical data collected by an optical distancing system. The optical data may be received from the optical distancing system or received from memory at the controller, which alternately refers to either the server controller 500, the device controller 600, or another controller or computing device. The optical data may be projected onto one or more predefined two-dimensional planes. The controller may calculate pixel values for the projected optical data based on a correlated panoramic image. Alternatively, the controller may calculate pixel values for the projected optical data based on an analysis of the optical data.

At act S103, the controller receives map data from a map database. The map data includes nodes and segments corresponding to paths and intersections. The map data may be stored in a spatial format or a delivery format (e.g., GDF format). The controller may be configured to convert the map data to an image. At S105, the controller selects a segment from the map data. In some embodiments, the segment is selected based on a detected position of the user device 100. In other embodiments, the segment is selected based on a routing algorithm or a user input.

At S107, the controller rotates the path side data based on the segment. The path side data may be rotated about the location of the segment. Alternatively, the path side data may be rotated about another location such as the edge of the path or a curb. The edge of the path or a curb may be determined by analyzed the optical data. The path side data may be rotated using a rotation matrix, a rotation vector, or a rotation quaternion. The rotation aligns the path side data with the map data.

At S109, the controller outputs the path side data and a portion of the map data. The path side data and the map data may be combined in an image that is displayed to a user. The image may be stored as an image file. The image file may be output from the server 120 to be stored in the database 130 or transmitted to the user device 100. The image file may be output from the user device 100 to be shown on display 611. In addition, the controller may assign the at least one image file to a navigation link or segment or other map/navigation object, such as a node or POI. The at least one image file and assignment may be stored in the database 130. In the case of multiple two-dimensional planes, the at least one image file may include a plurality of image files such that each image file corresponds to one of the plurality of predefined two-dimensional planes.

The controller may output a subset of the plurality of image files either to a display 611 in the user device-based embodiments or from the server 120 to the user device 100 in the server-based embodiments. The subset may be selected based on a configuration setting defined by a range of distance values. The subset may be selected based on an analysis of the optical data. The subset may be selected based on a navigation feature detected by the controller in the optical data. The navigation feature may be a road surface, a curb, a building facade, or other man-made or natural geographic feature.

Figure 19:
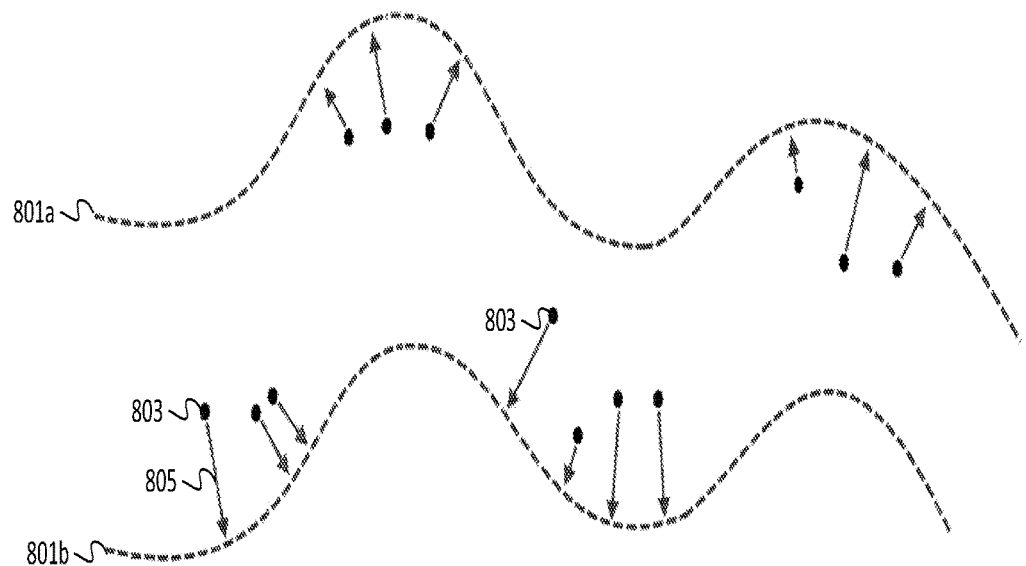
FIG. 19 illustrates curved projection planes.

FIG. 19 illustrates curved planes as an alternative to the Euclidean planes of FIG. 15. In the alternative to the two-dimensional planes 303a-c in FIG. 15, shown as planar in the Cartesian coordinates, the two-dimensional planes 303a-c may be curved planes which are planar in spherical coordinates. The radius of the curved planes may be determined by the curvature of an associated segment or pathway. Alternatively and as shown in FIG. 19, each of the two-dimensional planes 801a-b may be curved at multiple locations having varying radii of curvature.

In one example, the curved surfaced are defined by a set of parametric equations. In other examples, the curves may be defined according to the optical data 803 as defined by the distance algorithm, the statistical algorithm, the image processing algorithm, or the database algorithm, as discussed above. The lines 805 are orthogonal to the nearest point on the surface of the two-dimensional planes 801a-b. The orthogonal lines 805 show the projection of the optical data onto the two-dimensional planes 801a-b.

Figure 20:
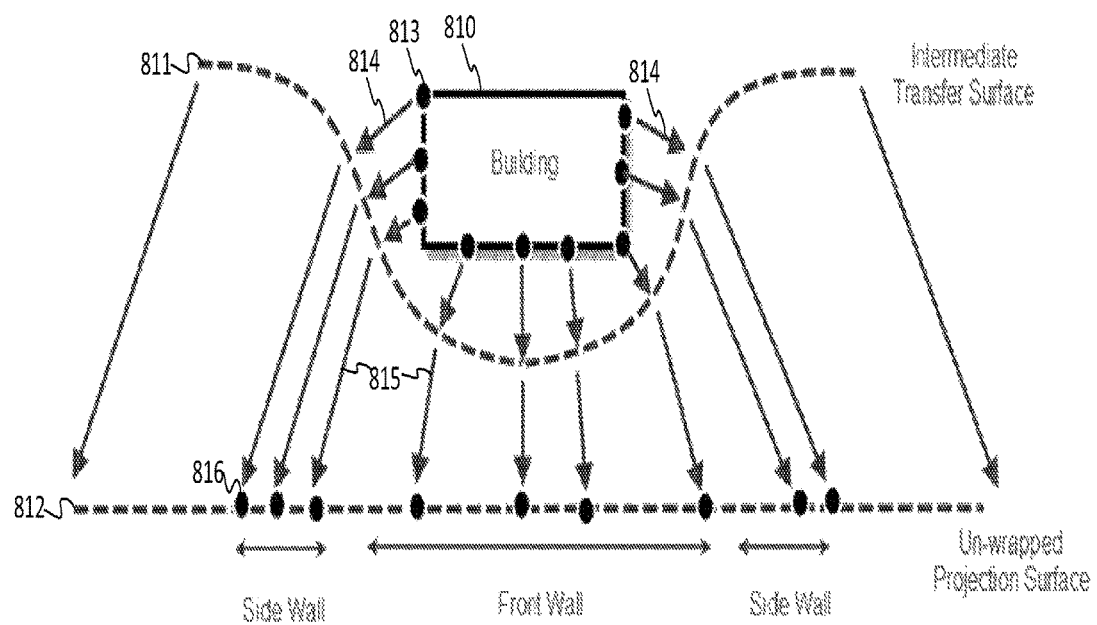
FIG. 20 illustrates an intermediate projection surface.

FIG. 20 illustrates an intermediate projection surface 811. The intermediate surface 811 non-linearly maps the optical data 813, which corresponds to opposite side of an object (e.g., building 810) to the path side data of the two-dimensional plane 812. The intermediate surface 811 is a mathematic surface rather than a physical surface. The intermediate surface 811 is defined to face multiple sides of the building 810. The curvature of the intermediate surface 811 may be calculated by the controller from a building footprint or by analyzing the optical data to identify the locations of buildings as discussed above.

The optical data 813 is projected to the intermediate surface 811. Each point of the optical data 813 is projected onto the closest location on the intermediate surface 811, as shown by first projection lines 814. The data projected onto the intermediate surface 811 is then projected onto the two-dimensional plane 812. The projection may be orthogonal. Alternatively, the projection may be based on the curvature of the intermediate surface 811 at each point, as shown by second projection lines 815. In other words, the data is projected onto the intermediate surface and then unwrapped into the two-dimensional plane 812. The second projection lines 815 may be at an acute angle to (not perpendicular to) the intermediate surface 811 or the two-dimensional plane 812 or both. The resulting path side data 816 is a pseudo-perspective of the path side imagery (e.g., building 810). The pseudo-perspective view of the path side imagery illustrates various sides of the building 810 in a seamless image. The pseudo-perspective view of the path side imagery illustrates some of the sides of buildings, which may or may not be proportional to the actual sizes of the buildings. The sides of the buildings may include a sign, entrance, or other POI useful in the path side imagery. The pseudo-perspective view of the path side imagery may be colorized or otherwise modified according to any of the embodiments above.

Figure 21A:
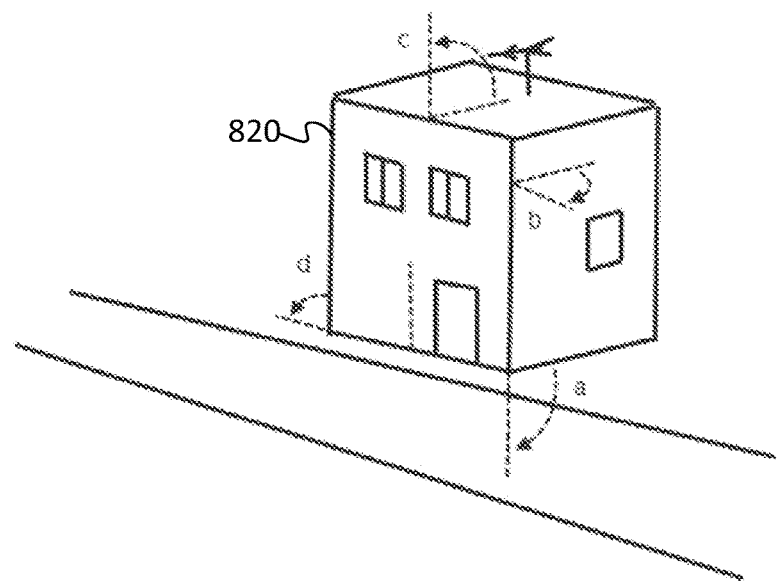
FIGS. 21A and 21B illustrated another embodiment for generating a map including path side imagery.
Figure 21B:
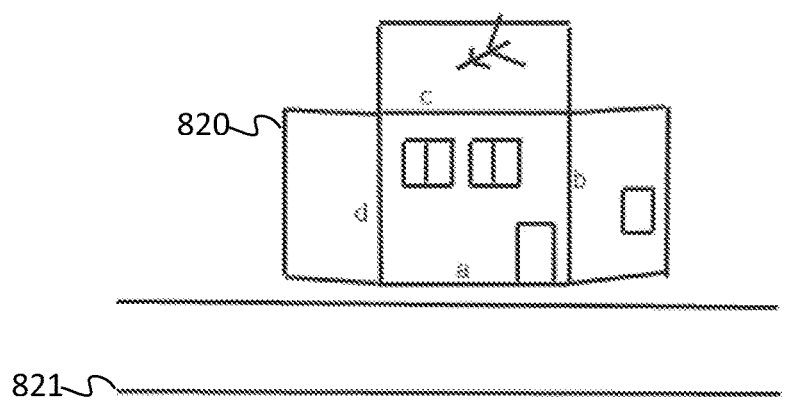

FIGS. 21A and 21B illustrate another embodiment for generating a map including path side imagery from a building footprint 820. The building footprint 820 may be accessed from an external database. The controller may be configured to calculate multiple folds of the building footprint to calculate path side data for the map. The multiple folds, as shown by angles a-d, unwrap or expand the three-dimensional building footprint building to a two-dimensional image, which is rotated or overlaid on the map 821 as shown by FIG. 21B.

Alternatives

The embodiments above describe rotating the path side data to align with map data in a two-dimensional map image. The rotation may be at any angle. In addition, the rotation may be a variable bend or curve in a three-dimensional space. In the resulting three-dimensional image, the path side data may form a U-shape or a saddle shape. In the U-shape the path side data raises up on both sides of the path. In the saddle shape the path side data raise up on one side of the path and goes down on the other. Bending or warping the path side data for display highlights features in the data.

An 'inpainting' algorithm may be used to fill spaces or holes between points. The inpainting algorithm may include blurring or diffusion techniques. For example, the inpainting algorithm may determine a pixel value for a particular pixel by averaging pixel values of neighboring pixels. When the spaces or holes span more than one optical data point or pixel, the inpainting algorithm may be repeated such that previously blurred/diffused pixels are averaged to determine a subsequent pixel value.

A hole filling algorithm and/or smoothing algorithm may be applied to resulting image planes to handle regions where the depth information density is insufficient or where image information is obstructed in all image views. The hole filling algorithm may interpolate pixel values for a selected pixel based on surrounding pixel values. The smoothing algorithm may variably adjust pixel values based on surrounding pixel values.

The embodiments described above have been described substantially in terms of street/path views. However, the embodiments herein may be applied to indoor environments and other types of pathways, such as indoor pathways, hallways, and office settings. The indoor environment may be surveyed in three-dimensional geographic coordinates to generate the optical data. The optical data may be created using any arbitrary viewpoint or perspective in the indoor environment. For example, shopping malls, pedways, and office buildings have pathways central to locations or points of interest within the indoor environment. The optical data may include geo-coordinates such as latitude, longitude, and altitude for each of plurality of points based on an IMU and/or GPS, as described above.

The optical data may be projected onto at least one predefined two-dimensional plane parallel to the pathway and/or the direction of movement of the optical distancing system as the optical data is collected. The predefined two-dimensional plane may be selected to estimate a storefront or office facade along the pathway. Image data from at least one panoramic image or image bubble, collected by a camera, may be associated with the storefront or office facade and referenced in another coordinate system. The image data of the image bubble is correlated with the geo-referenced three-dimensional space of the optical data. The two-dimensional plane is colorized or otherwise modified based on the image data. The data from the two-dimensional plane is rotated to overlay a map of the indoor environment. The resulting data is stored as an image file, which can be stored in a map or geographic database to simulate the view of a pedestrian from the pathway.

The embodiments described above including multiple layers of street/path side imagery include layers divided horizontally. Horizontal layers are defined by distances in the horizontal direction. The embodiments described above could alternatively or additionally include vertical layers defined by distances in the vertical direction. For example, the optical data may be projected onto a plurality of vertical planes defined by a user or automatically. The user may define one or more vertical thresholds. The vertical distance may be measured from the collection point of the optical data and/or the collection point of the image bubble. Alternatively, the vertical planes may be defined automatically. For example, the vertical planes may be selected according to the values of the optical data such that the optical data is divided evenly according to distance. Each optical data point may be projected onto the closest vertical plane. In another example, an image processing algorithm may define the planes according to trends in the optical data identifying navigation features in the optical data. The navigation features may include one or more of a building facade, a storefront, a doorway, a door, a window, or another feature.

The street/path side imagery is divided into a layer for each of the vertical planes. A first layer includes points with pixel values selected from one or more image bubbles according to the optical data projected onto a first plane. For example, the first layer may include objects closest vertically to the perspective of the street/path side imagery. The second layer includes points with pixel values selected from one or more image bubbles according to the optical data projected onto a second plane. In an outdoor environment, the first layer may include the lower building facade, and the second layer may include the tops of buildings. In an indoor environment, such as a shopping mall, the first layer may include storefronts on the first floor and the second layer may include storefronts on the second floor. In another example, the plurality of planes may be spherically shaped and defined by a threshold radius from the collection point of the optical data and/or the collection point of the image bubble.

The embodiments described above may be implemented using computer executable instructions stored in the memory 501, the memory 601, and/or other memory, which are non-transitory. The processors may execute computer executable instructions. The computer executable instructions may be written in any computer language, such as C++, C#, Java, Pascal, Visual Basic, Perl, HyperText Markup Language (HTML), JavaScript, assembly language, extensible markup language (XML) and any combination thereof.

The computer executable instructions may be logic encoded in one or more tangible media or one or more non-transitory tangible media for execution by the processors. Logic encoded in one or more tangible media for execution may be defined as instructions that are executable by the processors and that are provided on the computer-readable storage media, memories, or a combination thereof. Instructions for instructing a network device may be stored on any logic. As used herein, "logic", includes but is not limited to hardware, firmware, software in execution on a machine, and/or combinations of each to perform a function (s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The computer readable instructions may be stored on any non-transitory computer readable medium. A non-transitory computer readable medium may include, but are not limited to, a floppy disk, a hard disk, an ASIC, a compact disk, other optical medium, a random access memory (RAM), a read only memory (ROM), a memory chip or card, a memory stick, and other media from which a computer, a processor or other electronic device can read.

As used herein, the phrases "in communication" and "couple" are defined to mean directly connected to or indirectly connected through one or more intermediate components. Such intermediate components may include both hardware and software based components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The embodiments described above may be combined with systems and methods for generating path side imagery as described in copending application "PATH SIDE IMAGERY" by James D. Lynch, filed Dec. 30, 2011 (Ser. No. 13/340,923), which is incorporated by reference in its entirety.

Various embodiments described herein can be used alone or in combination with one another. The foregoing detailed description has described only a few of the many possible implementations of the present invention. It is intended that the foregoing detailed description be regarded as illustrative rather than limiting and that it is understood that the following claims including all equivalents are intended to define the scope of the invention.

The invention claimed is:

1. A method comprising:
   receiving a depthmap of optical distance data corresponding to a pathway;
   receiving image data from at least one panoramic image including physical features corresponding to a path side view;
   receiving map data including physical features corresponding to a top down view with respect to the pathway;
   dividing the optical distance data corresponding to the pathway into a plurality of planes based on one or more distance thresholds for each plane of the plurality of planes, wherein the one or more distance thresholds are associated with known reference points corresponding to the path side view;

correlating the optical distance data of the plurality of planes and the image data, wherein a geographic distance of each image data point determines which plane of the plurality of planes that the image data is associated with;

defining a pixel value for each point of a range of points of the optical distance data of each of the plurality of planes according to a section of the image data, wherein a size of each image data section is based on a length of an orthogonal line between each plane and each respective point of the optical distance data;

rotating the pixel values correlated with the optical distance data of at least two of the plurality of planes using the depthmap; and providing for display of map data including physical features corresponding to the top down view with respect to the pathway aligned with respective physical features corresponding to the path side view of the rotated pixel values in the same plane, wherein image data of each plane is displayed at a rate based on one or more distance thresholds of each plane.

2. The method of claim 1, wherein the pixels are rotated about a path segment for the pathway.

3. The method of claim 2, further comprising:
accessing map data for at least one of the plurality of planes from a map database, wherein the map data includes the path segment.

4. The method of claim 1, further comprising:
averaging the pixel values for the section of the image data; and
defining a new value for the optical data based on the averaged pixel values.

5. The method of claim 1, further comprising:
weighting the pixel values according to distance; and
defining a new value for the optical data based on the weighted pixel values.

6. The method claim 1, wherein the optical distance data is collected by a light detection and ranging (LIDAR) system.

7. The method of claim 1, further comprising:
filtering the optical distance data according to reflectivity of the optical distance data.

8. The method of claim 1, wherein
dividing the optical distance data into a plurality of planes is further based on distance to a path segment.

9. The method of claim 8, further comprising:
selecting at least one of the plurality of planes according to a user input; and
displaying the at least one of the plurality of planes and a portion of map data.

10. The method of claim 1, further comprising:
assigning a transparency value to the defined pixel values.

11. An apparatus comprising:
at least one processor; and
at least one memory including computer program code for one or more programs; the at least one memory and the computer program code configured to, with the at least one processor, cause the apparatus to at least perform:
receive a depthmap of optical distance data corresponding to a road segment;
receive image data from at least one panoramic image including physical features corresponding to a road side view;
receive map data including physical features corresponding to a top down view with respect to the road segment;
divide the optical distance data corresponding to the road segment into a plurality of planes based on one or more distance thresholds for each plane of the plurality of planes wherein the one or more distance thresholds are associated with known reference points corresponding to the road side view;
correlate the optical distance data of the plurality of planes and the image data, wherein a geographic distance of each image data point determines which plane of the plurality of planes that the image data is associated with;
colorize the optical distance data based on sections of the image data, wherein a size of each image data section is based on a length of an orthogonal line between each plane and each respective point of the optical distance data;
rotate the colorized optical distance data of at least two of the plurality of planes including the road segment; and
provide for display of a map including physical features corresponding to the top down view with respect to the road segment aligned with respective physical features corresponding to the road side view of the rotated pixel values in the same plane, wherein image data of each plane is displayed at a rate based on one or more distance thresholds of each plane and independent of the rate of the other planes.

12. The apparatus of claim 11, wherein the colorized optical distance data are rotated about a path segment for the road segment.

13. The apparatus of claim 11, the at least one memory and the computer program code configured to, with the at least one processor, cause the apparatus to:
average pixel values from the image data; and define colorized optical distance data based on the averaged pixel values.

14. The apparatus of claim 11, the at least one memory and the computer program code configured to, with the at least one processor, cause the apparatus to:
weight pixel values from the image data according to distance; and
define colorized optical distance data based on the weighted pixel values.

15. The apparatus of claim 11, wherein the optical distance data is collected by a light detection and ranging (LIDAR) system.

16. The apparatus of claim 11, the at least one memory and the computer program code configured to, with the at least one processor, cause the apparatus to:
divide the optical distance data into a plurality of layers further based on distance to a path segment.

17. The apparatus of claim 16, the at least one memory and the computer program code configured to, with the at least one processor, cause the apparatus to:
select at least one of the plurality of layers according to a user input; and
display the at least one of the plurality of layers and a portion of map data.

18. The apparatus of claim 11, wherein the colorized optical distance data is rotated using a rotation matrix.

19. The apparatus of claim 11, the at least one memory and the computer program code configured to, with the at least one processor, cause the apparatus to:
assign a transparency value to the defined pixel values.

20. A non-transitory computer readable medium having stored thereon a computer program, the computer program comprising instructions to cause a processor to:

identify a depthmap of optical distance data corresponding to a pathway;

identify image data from at least one panoramic image corresponding to a path side view from the pathway;

identify map data including physical features corresponding to a top down view with respect to the pathway;

divide the optical distance data corresponding to the pathway into a plurality of planes based on one or more distance thresholds for each plane of the plurality of planes, wherein the one or more distance thresholds are associated with known reference points corresponding to the path side view;

correlate the optical distance data of the plurality of planes and the image data, wherein a geographic distance of each image data point determines which plane of the plurality of planes that the image data is associated with;

determine a pixel value for each point of a range of points of the optical distance data of each of the plurality of planes according to a section of the image data, wherein a size of each image data section is based on a length of an orthogonal line between each plane and each respective point of the optical distance data;

assigning a transparency value to the determined pixel values;

align the pixel values correlated with the optical distance data to the plurality of planes using the depthmap; and provide for display of map data including physical features corresponding to the top down view with respect to the pathway with respective physical features corresponding to the path side view of the aligned pixel values in the same plane, wherein image data of each plane is displayed at a rate based on one or more distance thresholds of each plane.

* * * * *